Figure 1:
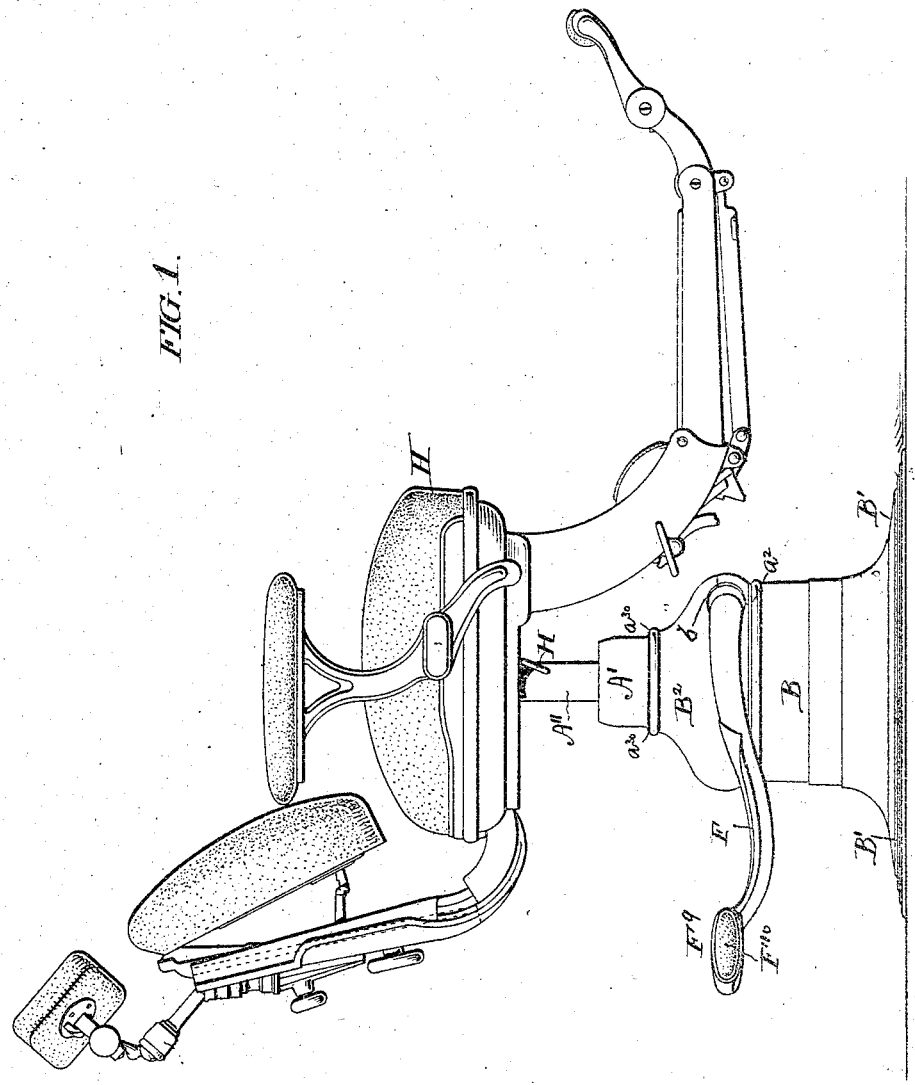

No. 663,143. Patented Dec. 4, 1900.
B. M. WILKERSON.
SUPPORTING AND ELEVATING MECHANISM FOR DENTAL CHAIRS.
(Application filed Nov. 25, 1898.)
(No Model.) 15 Sheets—Sheet 9.

WITNESSES: INVENTOR:

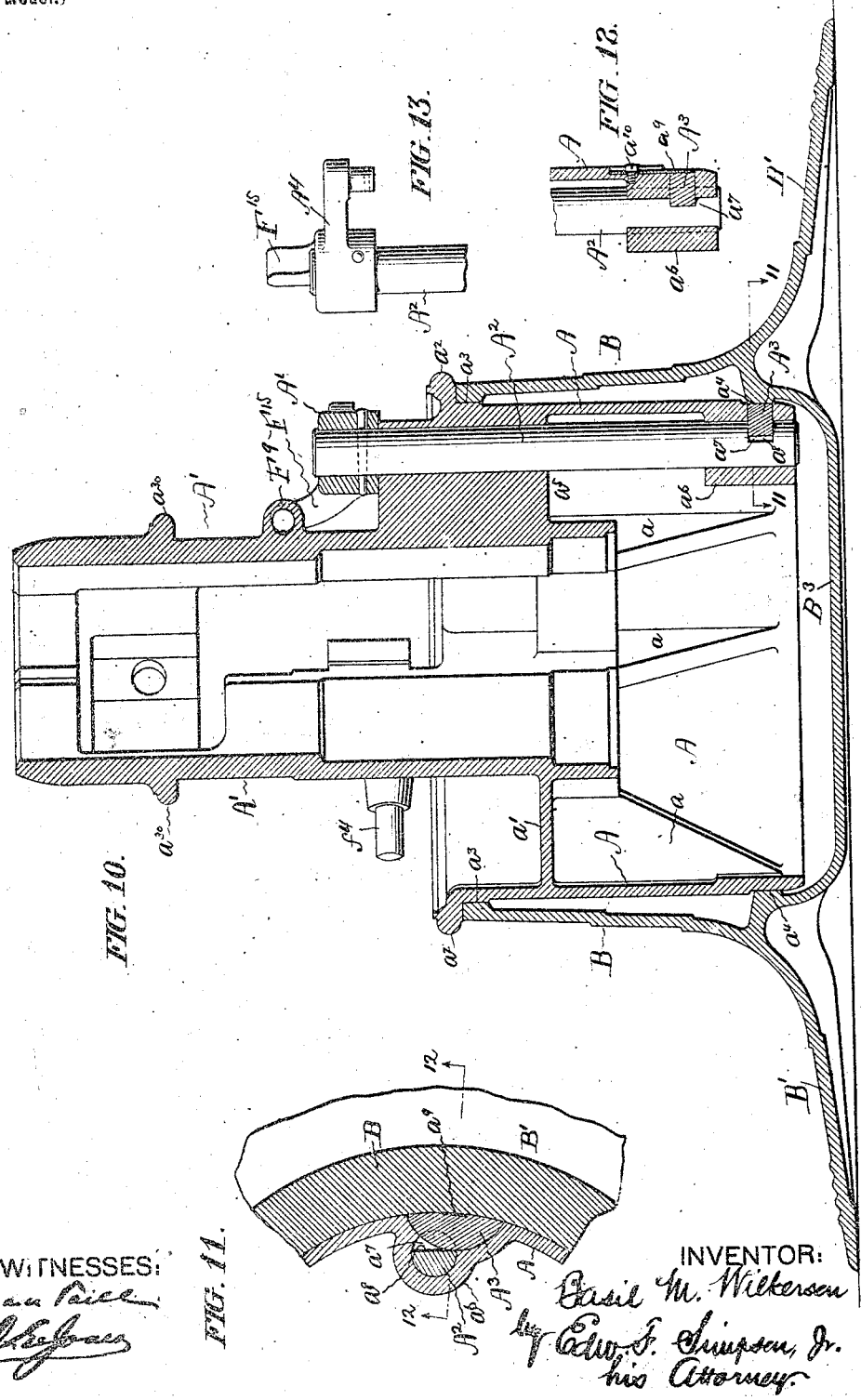

No. 663,143. Patented Dec. 4, 1900.
B. M. WILKERSON.
SUPPORTING AND ELEVATING MECHANISM FOR DENTAL CHAIRS.
(Application filed Nov. 25, 1898.)
(No Model.) 15 Sheets—Sheet 11.

WITNESSES:
INVENTOR:
Basil M. Wilkerson,
by Edw. F. Simpson, Jr.
his Attorney.

No. 663,143. Patented Dec. 4, 1900.
B. M. WILKERSON.
SUPPORTING AND ELEVATING MECHANISM FOR DENTAL CHAIRS.
(Application filed Nov. 25, 1898.)
(No Model.) 15 Sheets—Sheet 12.
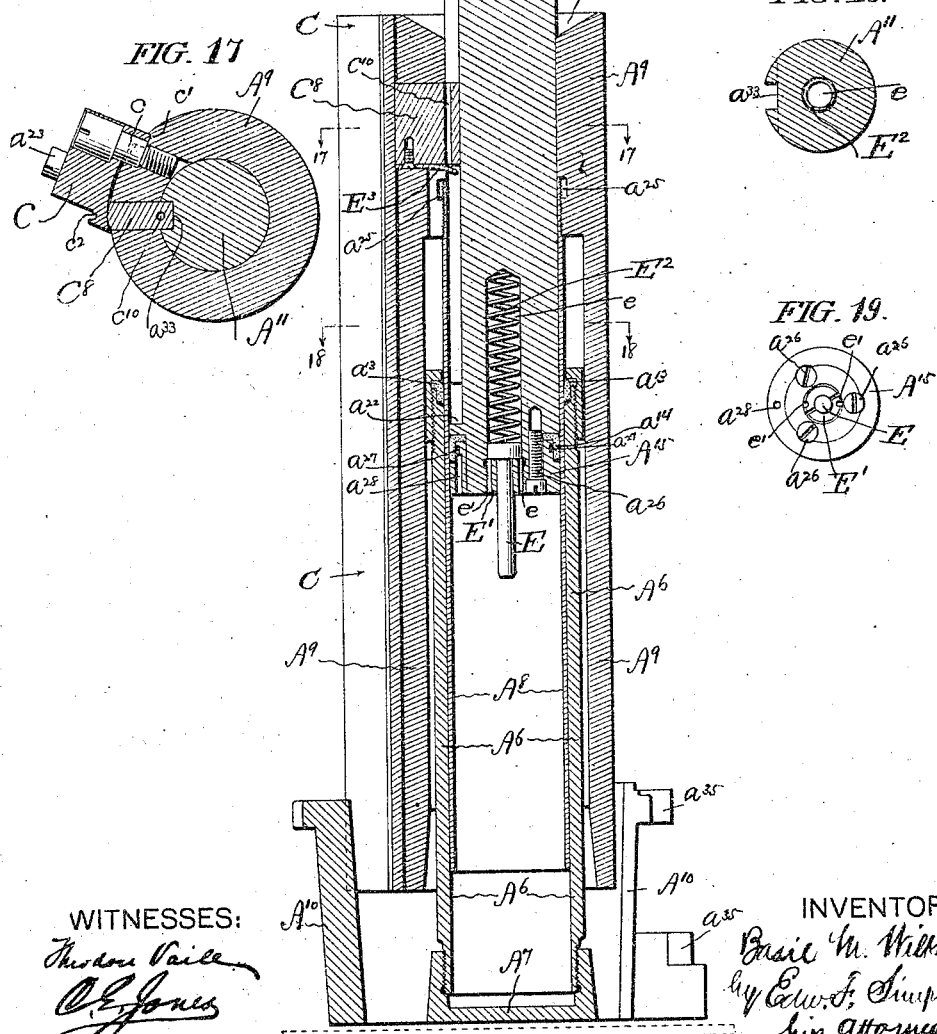
WITNESSES: INVENTOR:

No. 663,143. Patented Dec. 4, 1900.
B. M. WILKERSON.
SUPPORTING AND ELEVATING MECHANISM FOR DENTAL CHAIRS.
(Application filed Nov. 25, 1898.)
(No Model.) 15 Sheets—Sheet 13.
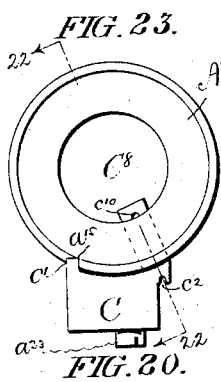
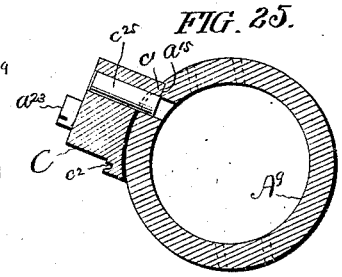
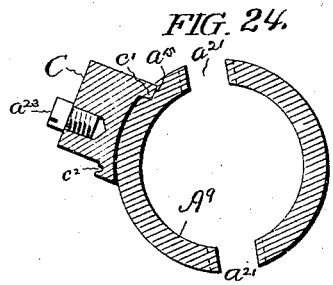
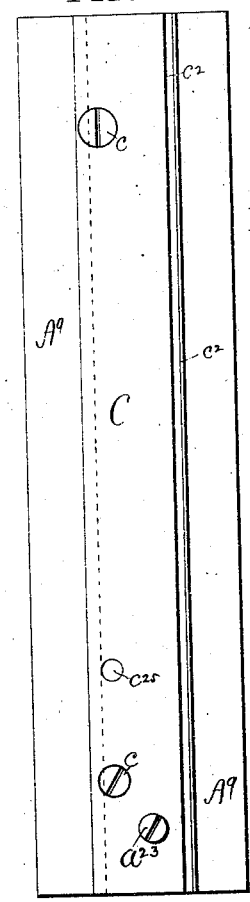
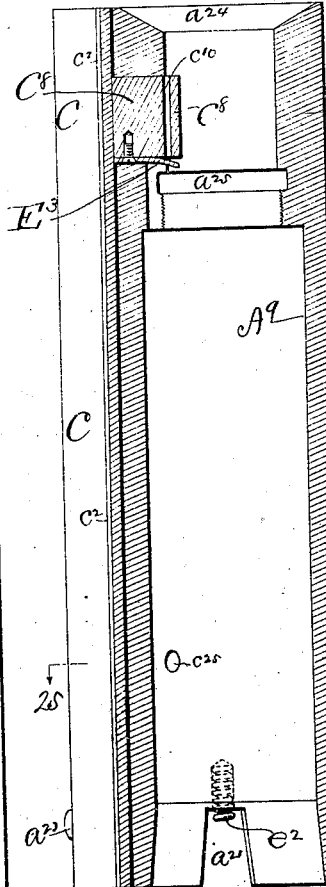
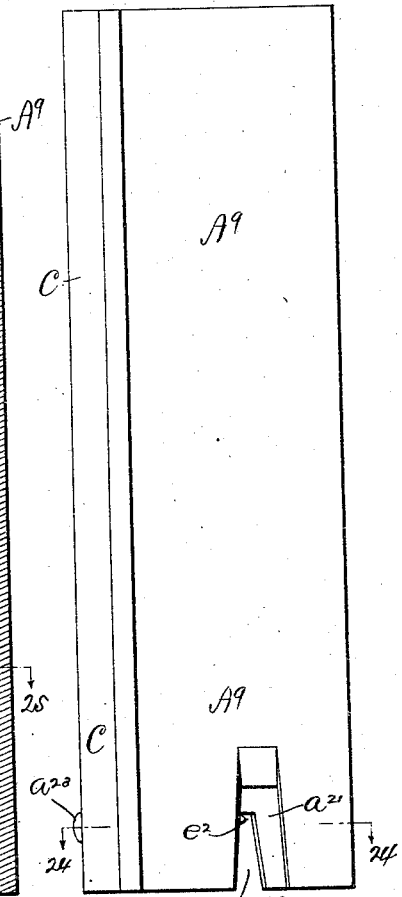
WITNESSES:
INVENTOR:
Basil M. Wilkerson,
by Edw. F. Simpson, Jr.
his Attorney.

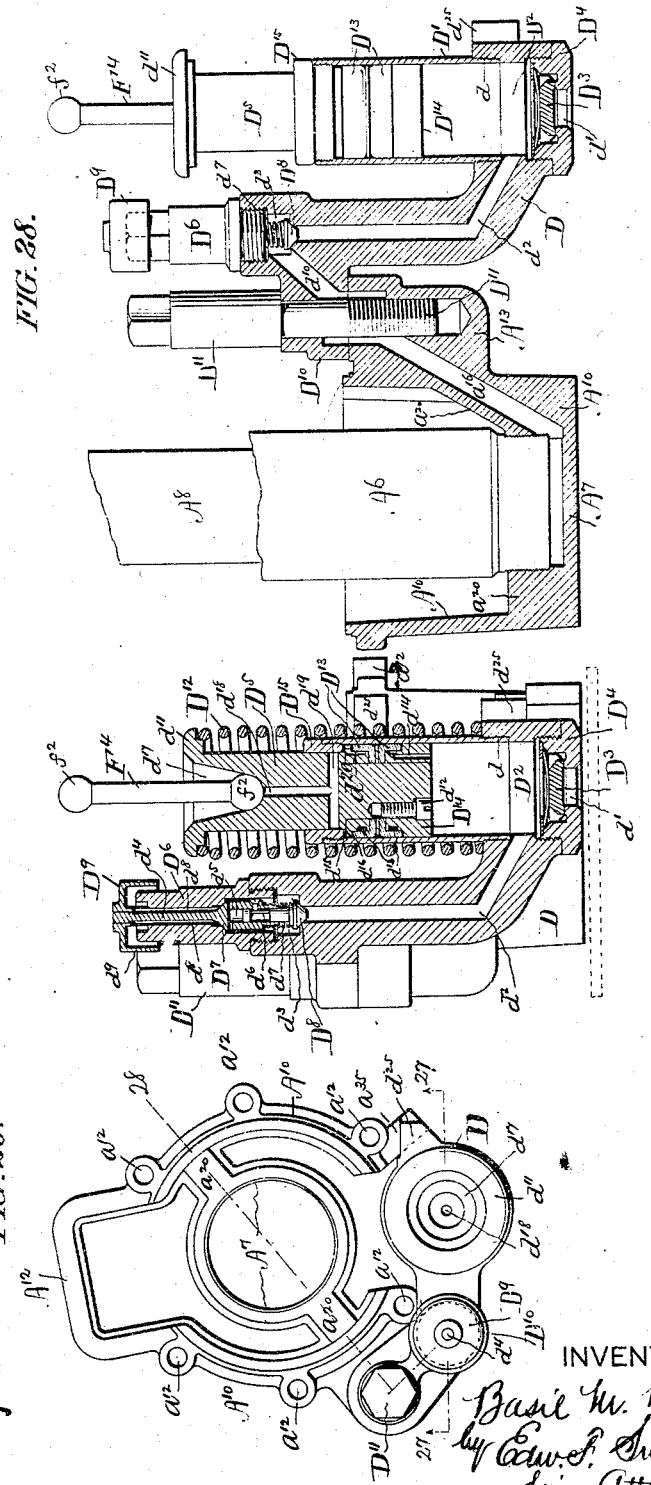

No. 663,143. Patented Dec. 4, 1900.
B. M. WILKERSON.
SUPPORTING AND ELEVATING MECHANISM FOR DENTAL CHAIRS.
(Application filed Nov. 25, 1898.)
(No Model.) 15 Sheets—Sheet 15.
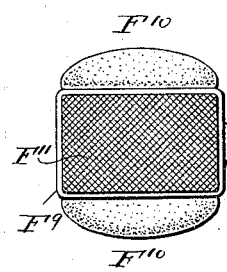
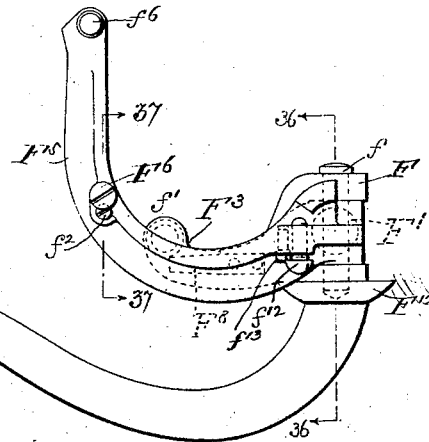
FIG. 34.
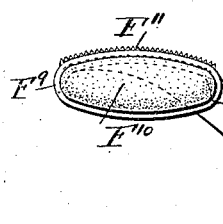
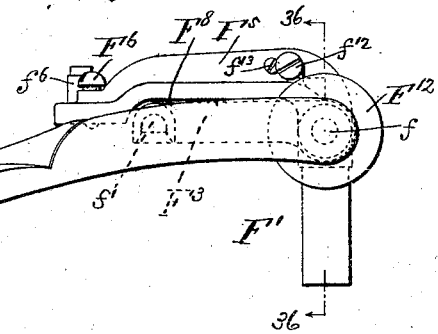
FIG. 35.
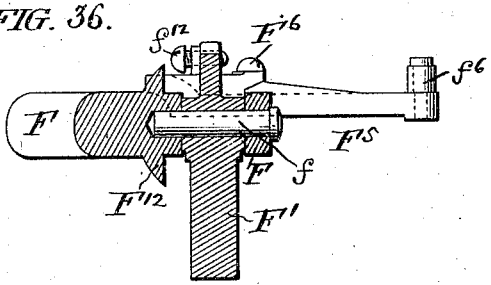
FIG. 36.
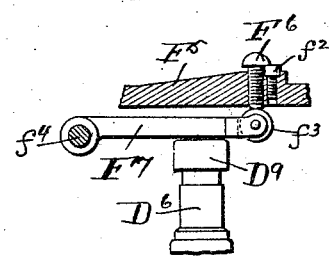
FIG. 37.
WITNESSES:
Theodore Paill
C. R. Jones
INVENTOR:
Basic M. Wilkerson,
by Edw. F. Simpson, Jr.
his Attorney.

UNITED STATES PATENT OFFICE.

BASIL M. WILKERSON, OF BALTIMORE, MARYLAND, ASSIGNOR TO THE S. S. WHITE DENTAL MANUFACTURING COMPANY, OF PHILADELPHIA, PENNSYLVANIA.

SUPPORTING AND ELEVATING MECHANISM FOR DENTAL CHAIRS.

SPECIFICATION forming part of Letters Patent No. 663,143, dated December 4, 1900.

Application filed November 25, 1898. Serial No. 697,344. (No model.)

*To all whom it may concern:*

Be it known that I, BASIL M. WILKERSON, a citizen of the United States, residing in the city of Baltimore, in the State of Maryland, have invented certain new and useful Improvements in Supporting and Elevating Mechanism for Dental Chairs; and I do hereby declare the following to be a full, clear, and exact description of the invention, such as will enable others skilled in the art to which it appertains to make and use the same.

My invention relates to supporting and elevating mechanism for dental chairs; and it consists in certain improvements, which will be hereinafter claimed.

My present improvements comprise a dental-chair base of novel construction in which are contained four distinct mechanisms which may be operated or controlled by a single foot-actuated operating-lever. These mechanisms are, first, horizontal rotating mechanism comprising means for locking the chair-body in any position to which it may be horizontally adjusted; second, elevating mechanism; third, mechanism for clamping the vertically-adjustable chair-body-supporting plunger, and, fourth, lowering mechanism. In addition to the base and the said mechanisms my invention also comprises a novel telescopic chair-body-supporting plunger and certain details of construction, all of which will be hereinafter fully described.

The accompanying drawings, in which similar letters refer to corresponding parts throughout the different views, represent a suitable embodiment of my improvements.

Figure 2:
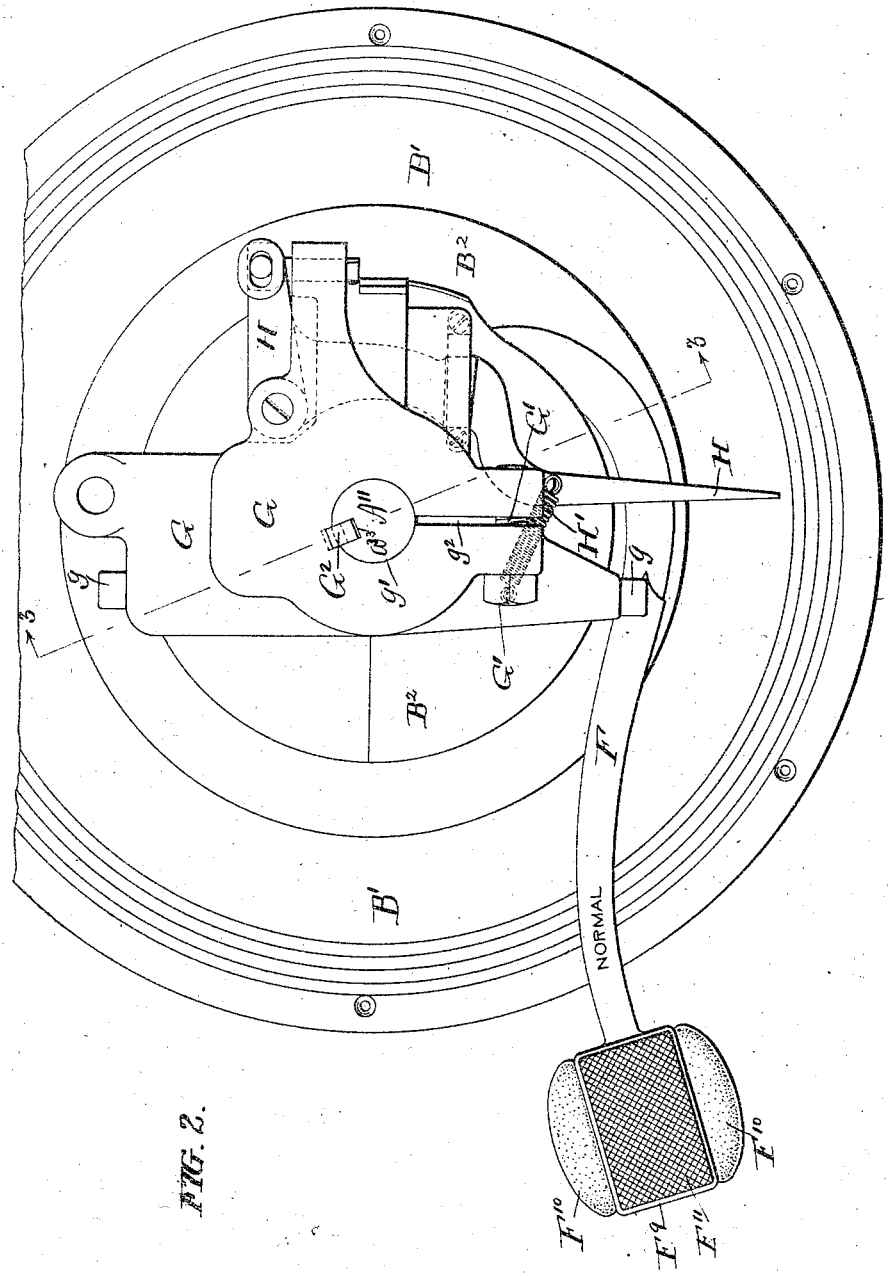
Figure 3:
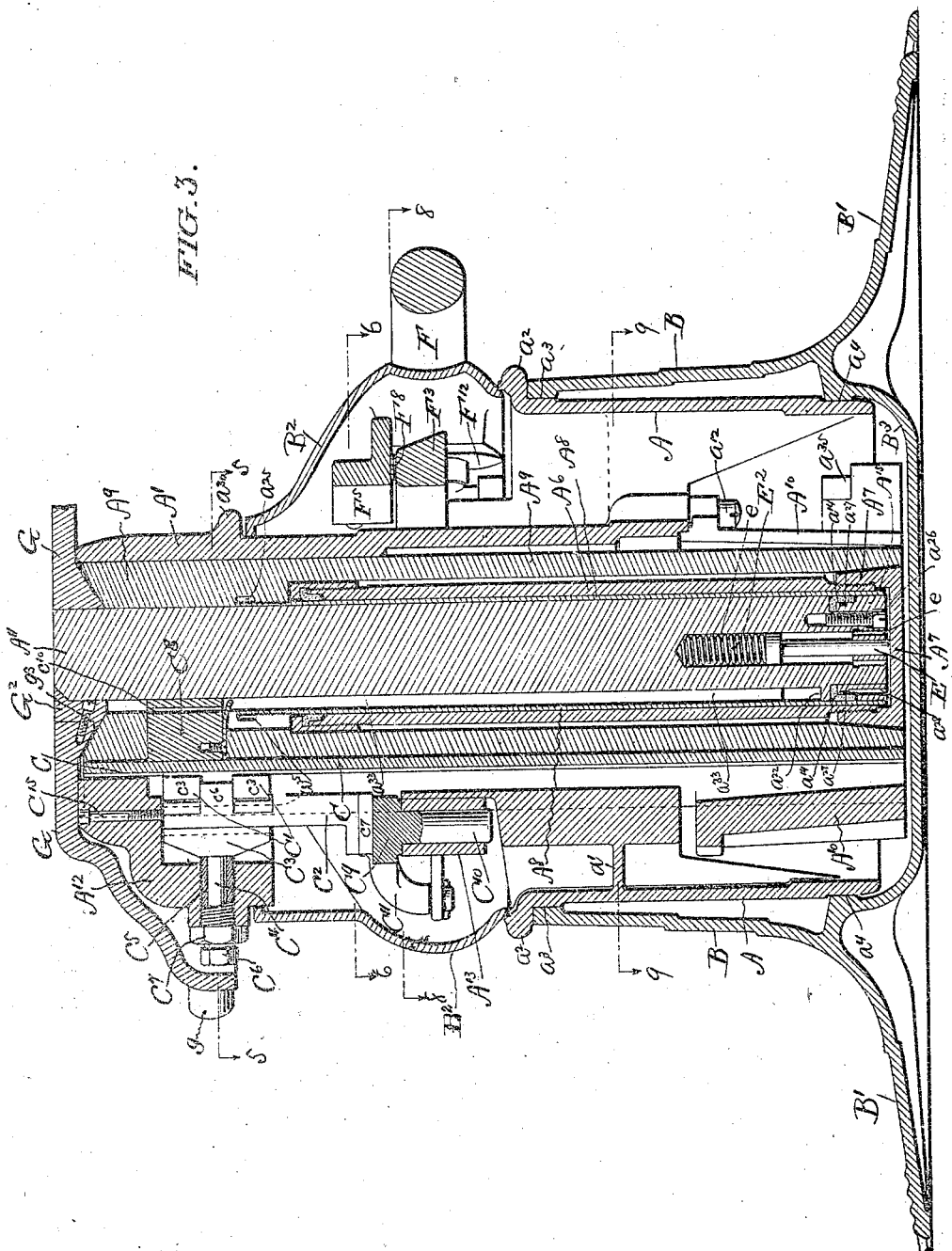
Figure 4:
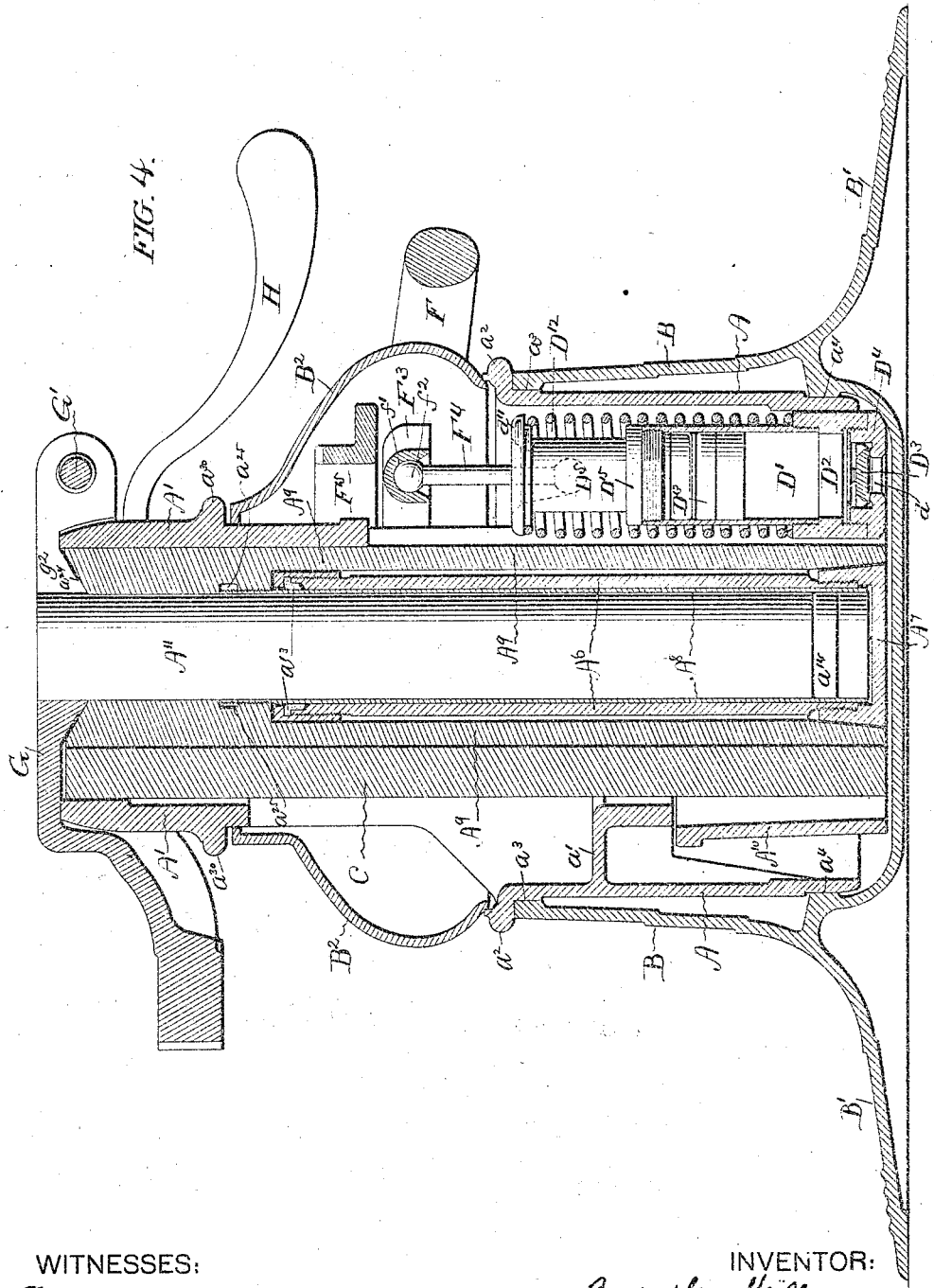
Figure 5:
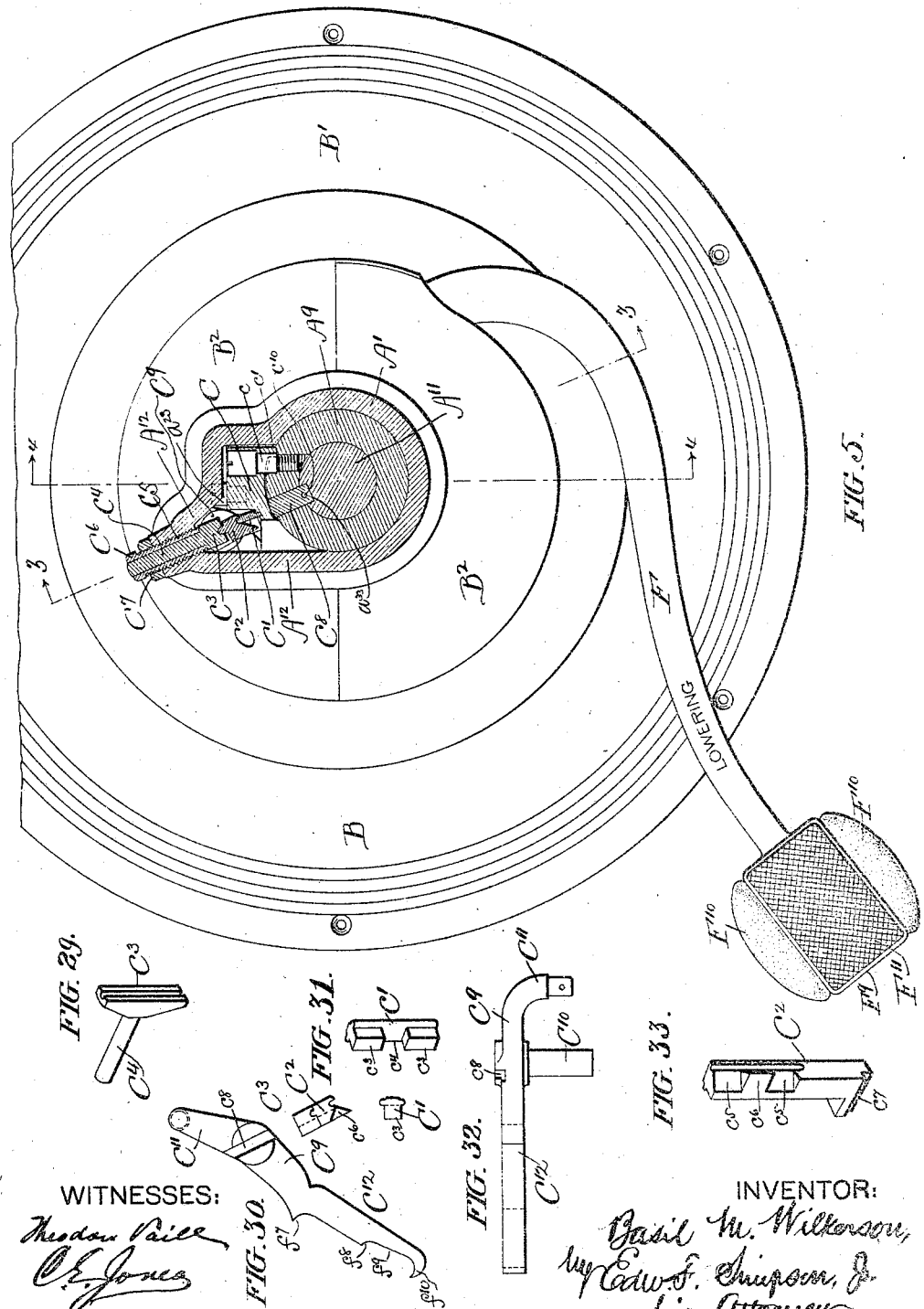
Figure 6:
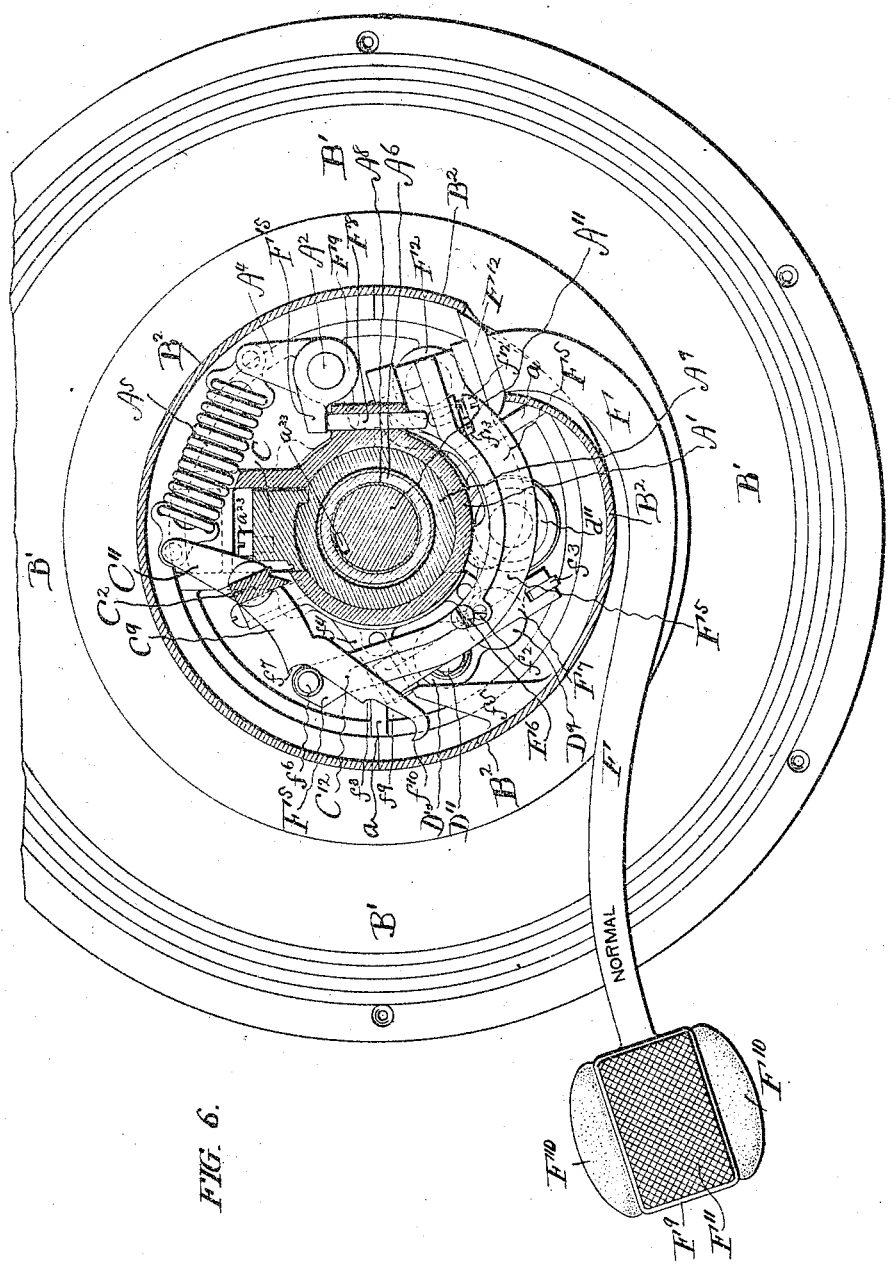
Figure 7:
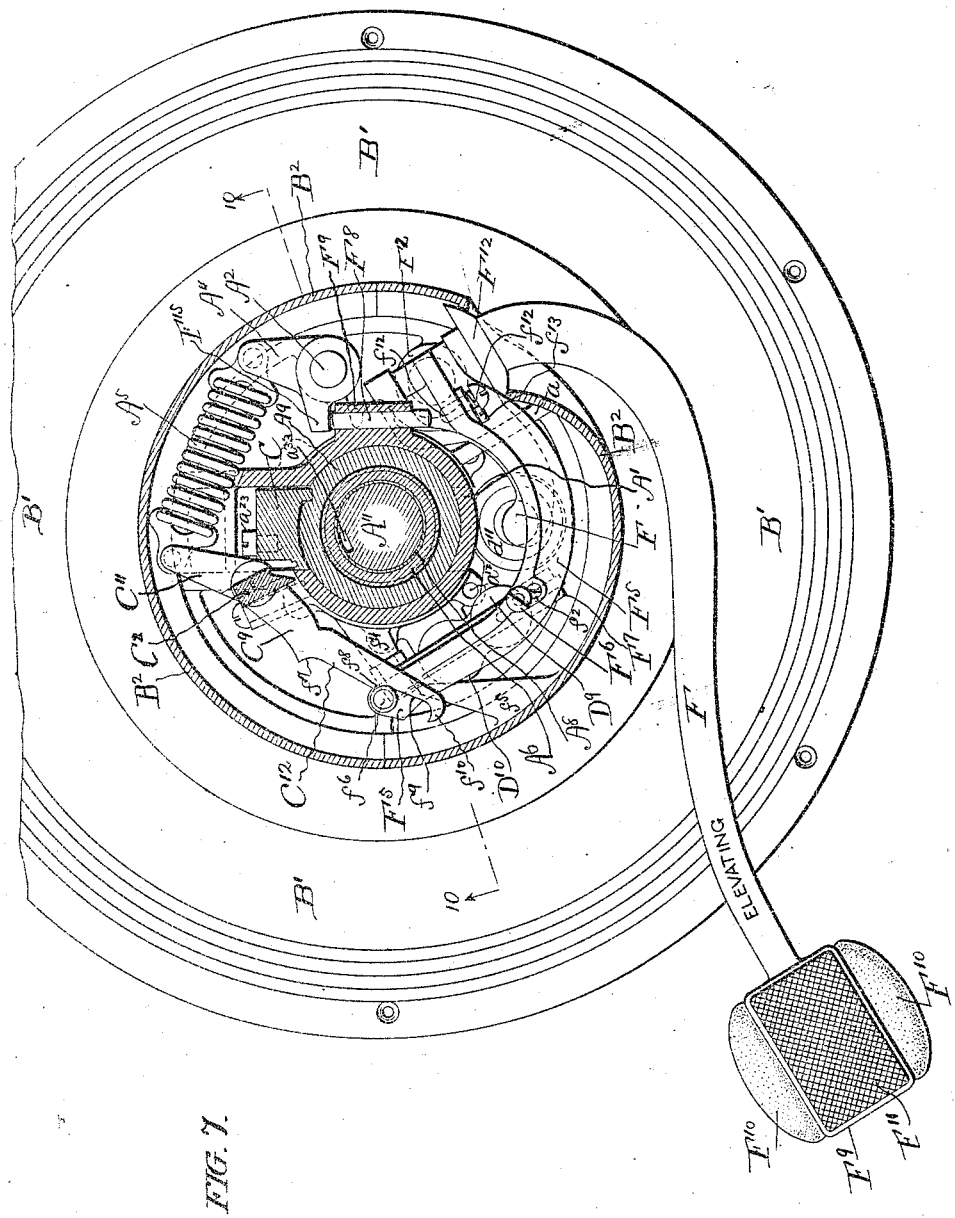
Figure 8:
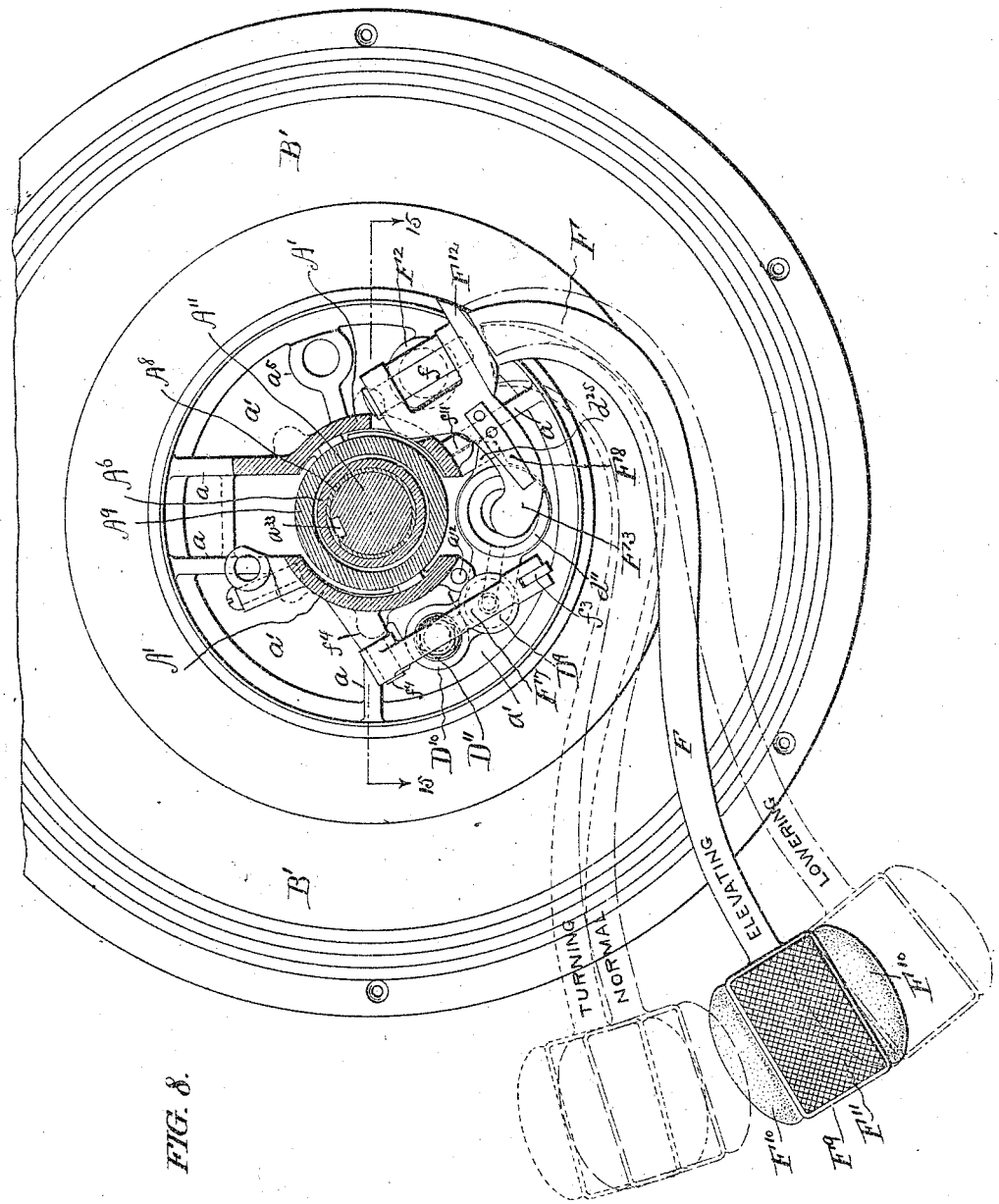
Figure 9:
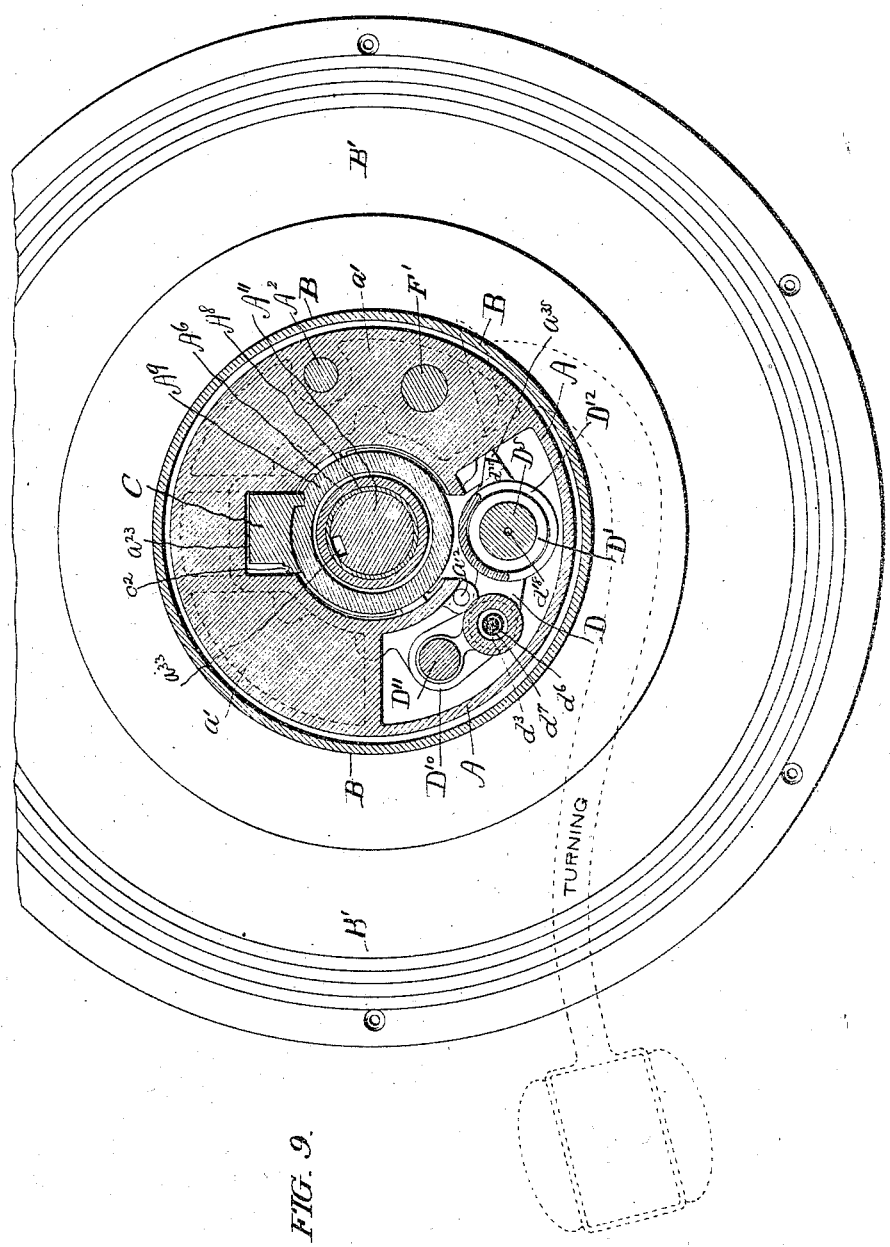
Figures 14, 15:
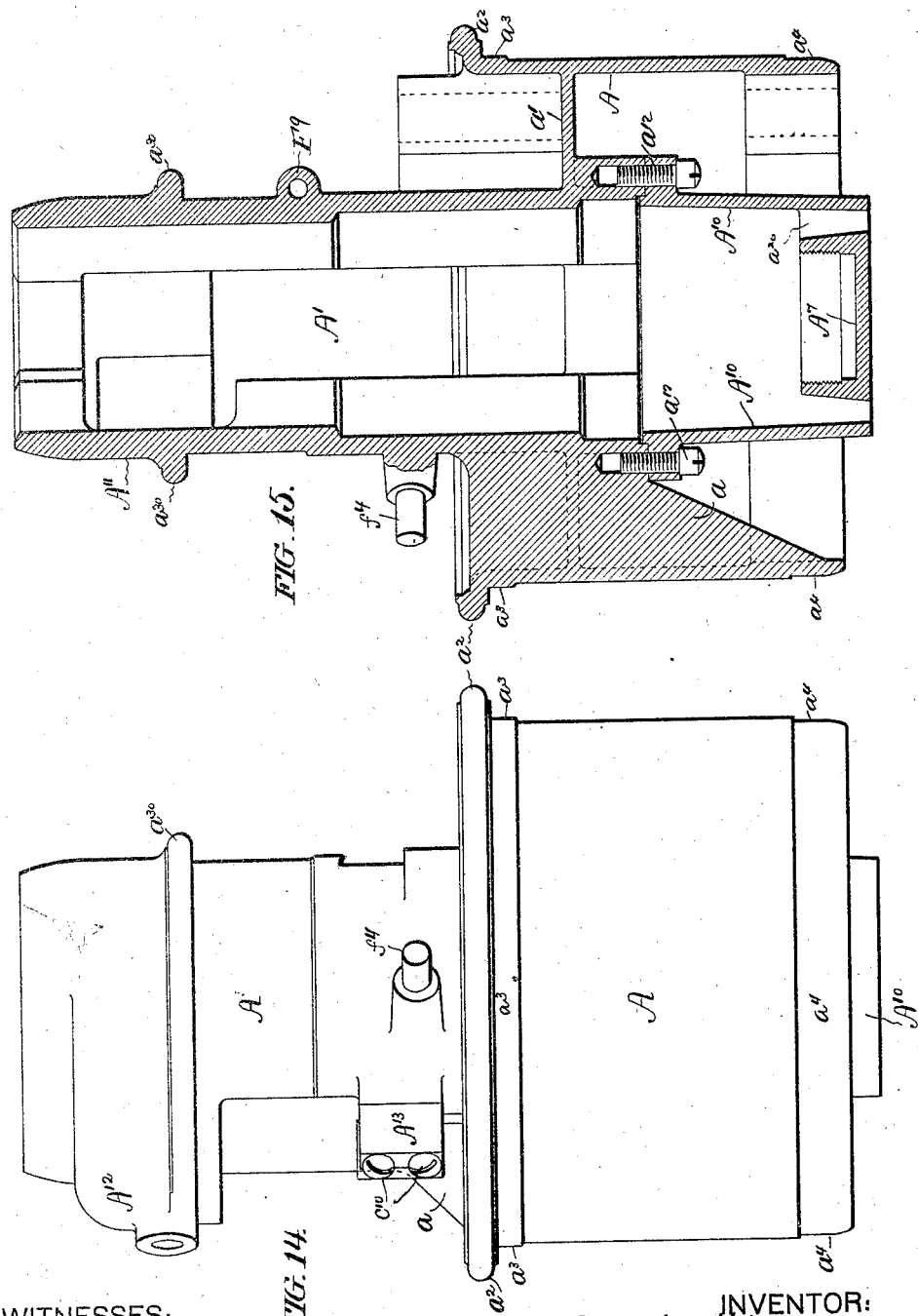

Figure 1 is a view in side elevation of the chair complete. Fig. 2 is a top or plan view of the base portion of the chair with the chair-body omitted. Fig. 3 is a vertical central sectional view of the base portion of the chair on the line 3 3 of Fig. 5. Fig. 4 is a similar view on the line 4 4 of Fig. 5, some parts being in side elevation. Fig. 5 is a top or plan view of the base portion of the chair with some parts shown in horizontal section on the line 5 5 of Fig. 3. Fig. 6 is a similar view, the section being taken on the line 6 6 of Fig. 3 and with the operating-lever shown in its normal position. Fig. 7 is a similar view on the same sectional line, but with the parts in different positions, the operating-lever being in its position for elevating. Fig. 8 is a similar view on the line 8 8 of Fig. 3, the operating-lever being shown in full lines in its elevating position and in dotted lines in its other positions. Fig. 9 is a similar view on the line 9 9 of said Fig. 3. Fig. 10 is a vertical sectional view, drawn on the line 10 10 of Fig. 7, of the rotary supporting frame or casting and the pedestal or base with the supporting and elevating mechanism omitted, and particularly showing the locking mechanism between said rotary supporting-frame and said pedestal. Fig. 11 is a horizontal section on the line 11 11 of Fig. 10. Fig. 12 is a vertical section on the line 12 12 of Fig. 11, and Fig. 13 is a side elevation of the upper end of the clamp-rod and its bell-crank lever. Fig. 14 is a view in side elevation of the rotary supporting-frame detached, and Fig. 15 is a vertical section of the same on the line 15 15 of Fig. 8. Fig. 16 is a vertical central sectional view on the line 3 3 of Figs. 2 and 5 of the telescopic supporting and elevating mechanism, the supporting-frame and pedestal being omitted. Fig. 17 is a horizontal section on the line 17 17 of Fig. 16. Fig. 18 is a section through one member of the telescopic elevating mechanism on the line 18 18 of Fig. 16, and Fig. 19 is an inverted plan view of the lower end of said member. Fig. 20 is a view in side elevation of the guide-cylinder of the supporting and elevating mechanism; and Fig. 21 is a similar view of the same, showing it turned at a right angle. Fig. 22 is a central vertical sectional view of said cylinder on the line 22 22 of Fig. 23. Fig. 23 is a plan or top view of said cylinder. Fig. 24 is a cross-section of the same on the line 24 24 of Fig. 21, and Fig. 25 is a cross-section thereof on the line 25 25 of Fig. 22. Fig. 26 is a top or plan view of the pump, its supporting-casting, and valves. Fig. 27 is a vertical section of the same on the line 27 27 of Fig. 26. Fig. 28 is a sectional diagrammatic view of the pump, valves, and plunger-cylinder, the section being drawn on the lines 27 28. Figs. 29 to 33, inclusive, Sheet 5, are separate views of the various parts of the telescopic plunger-clamping mechanism. Fig. 34 is a plan or top view of the main operating-lever detached. Fig. 35 is a view in side elevation of the same. Fig. 36 is a section of the same on the line 36 36 of Figs. 34 and 35, and Fig. 37 is a section on the line 37 37 of Fig. 34.

*Base.*—The term "base" used throughout the specification and claims designates a structure comprising a stationary or non-rotatable pedestal, as B, a rotatable supporting-frame, as A, and a detachable cap or dome, as $B^2$. (See particularly Figs. 1, 3, 4, 10, 14, and 15.) The pedestal B, as shown, is provided with a closed bottom $B^3$ and serves as the liquid-reservoir of the base and is also preferably provided with an annular or disk portion $B'$ for resting upon the floor. Rotatably fitted in said pedestal B is the supporting frame or casting A, which supports and carries the entire chair-body supporting and elevating mechanism. The supporting-frame (see particularly Figs. 10, 14, and 15) consists of an outer or main cylindrical section A and an inner cylindrical section $A'$, connected to said outer cylinder and which extends above the top of the same. The outer cylindrical section A of the supporting-frame is formed at its upper end with an annular flange $a^2$, which rests and turns upon the upper end of the pedestal B and has near its top and bottom bearing-surfaces $a^3$ $a^4$, which bear against corresponding surfaces on the interior of the pedestal. By this construction the supporting-frame is supported within the pedestal and may be freely rotated therein to provide for the horizontal turning movement or adjustment of the chair-body, which, as before stated, is supported by way of said supporting-frame.

The two cylindrical sections A and $A'$ of the supporting-frame are connected by means of vertical webs $a$ and a horizontal web or plate $a'$. (See Figs. 9, 10, and 15.) The purpose of the horizontal web or plate $a'$ is mainly to hold the respective sections of the supporting-frame together and to strengthen the entire structure; but it also admirably serves as a floor or base for a portion of the elevating and lowering mechanism and protects the oil in the reservoir from any foreign matter that may fall into the base when the upper end of the same is exposed.

A detachable cap or dome $B^2$, forming part of the base and preferably made in two sections, (see Figs. 1, 2, 3, and 4,) is suitably fitted upon the supporting-frame in such a way as to cover the space between the sections of said supporting-frame, thus completely inclosing the mechanism contained in the base. The lower end of the cap rests upon the upper end of the outer cylinder A of the supporting-frame, while the upper end of said cap surrounds the inner section $A'$ of said frame just below an exterior flange or annular shoulder $a^{30}$ thereon, and the sections of the cap may be bolted together in any suitable manner. As will be more fully explained hereinafter, the detachable cap is wholly independent of the elevating and lowering mechanism contained in the base and is also independent of the operating-lever for said mechanism, whereby when one or both sections of the cap are removed the entire mechanisms contained in the base are exposed to view and while thus exposed may be freely operated. When the cap is thus removed, the horizontal web or plate $a'$, as before stated, serves to prevent foreign matter from falling into the oil in the reservoir beneath said web.

*Supporting-frame-locking mechanism.*—In order to lock the chair-body in any position to which it may be horizontally rotated and to prevent it from being accidentally turned, I have provided suitable locking mechanism between the rotatable supporting-frame and the non-rotatable pedestal. This locking mechanism (see Figs. 10, 11, 12, and 13) may consist of a vertical rod $A^2$, mounted to turn in bearings $a^5$ and $a^6$ inside the supporting-frame, and means actuated by the turning of said rod for frictionally engaging the pedestal to lock the supporting-frame thereto. In the present instance I have shown this means as consisting of a clamp block or shoe $A^3$, adapted to slide horizontally in a bearing in said supporting-frame and in a notch or recess $a^7$ in the rod $A^2$, near the lower end thereof, the outer surface of said block corresponding to the curvature of the bearing-surface of the pedestal, between the same and the lower end of the supporting-frame. The inner surface of the clamp-block is also curved and is borne upon by a flattened or cam surface $a^8$ on the rod $A^2$, formed by the inner wall of the recess $a^7$. When the rod $A^2$ is turned in one direction, its flattened or cam surface forces the clamp-block tightly against the pedestal and securely locks the rotatable supporting-frame to the non-rotatable pedestal, thus preventing rotation of the chair-body. If desired, a light plate-spring $a^9$ may be secured at $a^{10}$ to the outside of the supporting-frame and fitted in a groove in the outer or bearing surface of the clamp-block to hold the same in place when the supporting-frame is removed from the pedestal, while not interfering with the free movement of said block. To the top of the rod $A^2$ is attached a bell-crank lever $A^4$, (see Figs. 6 and 13,) to one arm of which is secured a coiled wire spring $A^5$, which acts upon the lever with a tendency to turn the rod $A^2$ in a direction to force the clamp-block against the pedestal, as just described, this being the normal position of the rod. The manner of turning the rod for leaving the supporting-frame free to be rotated will be explained hereinafter. Obviously various forms of clamping or locking devices other than the particular clamp-block may be used in lieu thereof.

*Chair-body-supporting plunger.*—The mechanism for supporting the chair-body and by which the same may be raised and lowered is as follows, (see Figs. 3, 4, 6, and 15 to 25, inclusive:) Rigidly connected to the supporting-frame A is an upright cylinder $A^6$, which will hereinafter be designated the "fixed" plunger-cylinder. This plunger-cylinder is shown as having screw-threaded connection with a socket-piece $A^7$ at the lower end of the inner section $A'$ of the supporting-frame. For convenience of manufacture I prefer to make the lower portion $A^{10}$ of the inner section $A'$ of the supporting-frame separate and connect it to said frame by means of screws $a^{12}$. (See Figs. 3 and 15.) The socket-piece $A^7$ may be cast integral with the lower portion $A^{10}$ of the inner section $A'$ of the supporting-frame, and it closes the lower end of the fixed plunger-cylinder $A^6$. It is shown as being held in place by means of webs $a^{20}$. (Best shown in Fig. 26.)

Fitted in the fixed plunger-cylinder $A^6$ and movable up and down therein is the cylindrical member $A^8$ of the vertically-movable telescopic chair-body-supporting plunger. A guide-cylinder $A^9$ is rigidly connected to the upper end of and moves with the cylindrical member $A^8$ of the telescopic plunger and surrounds and is adapted to move up and down upon the fixed plunger-cylinder $A^6$ and also has bearing in the inner cylindrical section $A'$ of the supporting-frame A. Notches $a^{21}$ (see Figs. 21, 22, and 24) are formed in the lower end of the guide-cylinder $A^9$ and straddle the webs $a^{20}$ of the socket-piece $A^7$ when said cylinder is in its lowest position, so that said webs do not interfere with the full descent of the guide-cylinder.

The piston member $A^{11}$ of the telescopic supporting-plunger, upon which member the chair-body is mounted, as hereinafter explained, is preferably solid and is fitted to be moved up and down in the cylindrical member $A^8$ of the plunger and also has bearing in the guide-cylinder $A^9$, at and near the top thereof. Suitable packing $a^{13}$ is provided at the top of the fixed plunger-cylinder $A^6$ for making a liquid-tight connection between the inside of this cylinder and the cylindrical member $A^8$ of the telescopic plunger. The lower end of the piston member $A^{11}$ of the plunger is also provided with suitable packing $a^{14}$ for making it fit liquid-tight in the cylindrical member $A^8$ of the plunger. I prefer that this piston-packing be constructed as follows: The cup-shaped leather packing $a^{14}$ is flexible and is held in place some distance from the lower end of the piston by means of a metallic head $A^{15}$, the same diameter as the piston, and secured thereto by screws $a^{26}$. An annular groove or channel $a^{27}$ is cut in the metallic head $A^{15}$ of the piston behind the leather packing adjacent to and opening into the groove in the metallic head in which the packing is fitted. A vertical port $a^{28}$ is made in the metallic head and leads into the channel $a^{27}$. When the piston member of the plunger is being elevated and also when it is descending, the oil in the plunger-cylinder under pressure beneath the piston is forced through the port $a^{28}$ into the channel $a^{27}$ and the cup-shaped packing is expanded against the cylindrical member $A^8$ of the telescopic plunger, whereby the proper close contact of the packing with said cylinder is insured.

In order to relieve the chair from all jar and shock when the chair-body-supporting plunger reaches the extreme of its up and down movements, I have provided said plunger with suitable buffing devices, which will effectually cushion the plunger at the end of its upward movement as well as at the end of its downward movement.

Referring to Figs. 3, 16, and 19, it will be seen that the lower end of the piston member $A^{11}$ of the telescopic supporting-plunger is bored out centrally to form an oil-chamber $e$, and a buffer-rod or plunger E is fitted to reciprocate in said chamber. Said buffer-rod is held in place by means of a screw-plug $E'$ closing the lower end of the oil-chamber $e$, the stem of the rod passing through a central opening in said screw-plug and the head of the rod abutting against said plug when the rod is in its lowest position. A spiral spring $E^2$ is confined in the oil-chamber $e$, between the upper end thereof and the head of the buffer-rod, and serves to cause the buffer-rod to project beyond the lower end of the piston. The screw-plug $E'$ is formed with small holes $e'$, and the diameter of the head of the buffer-rod is slightly smaller than the oil-chamber of the piston in order that oil may pass between the plunger-cylinder and the oil-chamber $e$, or channels or grooves may be cut in the head of the buffer-rod for this purpose.

When the piston is in an elevated position relatively to the bottom of the plunger-cylinder $A^6$, the spring $E^2$ forces the buffer-rod downward and the oil-chamber is filled with oil, which enters through the openings $e'$ in the screw-plug $E'$ and passes through or around the head of the buffer-rod. When the piston descends just before the end of its downstroke, the buffer-rod strikes the bottom of the plunger-cylinder and is forced upward against the stress of the spring $E^2$, and the oil in the chamber above the buffer-rod escapes back to the plunger-cylinder by way of the space between the head of the buffer-rod and the walls of the chamber and the openings $e'$. The oil escapes from the oil-chamber very slowly and affords a cushion for the buffer-rod, which thereby cushions the final movement of the piston and relieves the chair from all jar or shock in its descent.

Referring now to Figs. 21 and 22, one of the notches $a^{21}$ in the lower end of the guide-cylinder $A^9$ of the telescopic supporting-plunger is provided with a coiled spring $e^2$, which is seated in a socket opening into the top of said notch, the spring projecting into said socket. When in the descent of the chair-body the guide-cylinder $A^9$ reaches its lowest position, the spring $e^2$ strikes against one of the webs $a^{20}$ and acts as a buffer to relieve said guide-cylinder from jar.

The upward movement of the piston member $A^{11}$ of the telescopic supporting-plunger is limited by a shoulder $a^{22}$, formed by the lower end of a longitudinal groove $a^{33}$ in said piston member coming in contact with a stop on the upper end of the guide-cylinder $A^9$ projecting into said groove. This stop is formed by a clamp block or shoe $C^8$, farther on to be explained. (See Fig. 3 or 16.) Secured upon the lower edge of said clamp-block is a plate-spring $E^3$, which normally stands off from said clamp-block, and when said piston reaches the limit of its upward movement in the guide-cylinder $A^9$ instead of striking directly against the clamp-block or whatever stop may be used the shoulder $a^{22}$ is met by said spring $E^3$, and the piston is thus relieved of shock or jar.

A suitable stop-lug formed by a screw $a^{23}$ (see Figs. 20 to 25, inclusive) is placed on the outside of the guide-cylinder $A^9$, near the bottom thereof, and serves to limit the upward movement of said guide-cylinder by coming in contact with the upper end of the inner section $A'$ of the supporting-frame. A spring (not shown) similar to the spring $E^3$ should be provided for cushioning the guide-cylinder when it reaches the limit of its upward movement. In this way not only is the telescopic supporting-plunger cushioned at the ends of its upward and downward movements, but the members or sections of the plunger are likewise cushioned at the ends of their movements. In other words, all the movable parts of the supporting-plunger which are adapted to strike other parts are cushioned, whereby the operation of the supporting mechanism is noiseless and without shock or jar.

The upper end of the guide-cylinder $A^9$ may be beveled off to form a trough-like depression $a^{24}$ around the piston $A^{11}$, adapted to catch any oil that may be carried up by said piston and which runs down therefrom. The oil which collects in this depression may escape therefrom by way of the groove $a^{33}$ in the piston and a hole $c^{10}$ in the before-mentioned clamp-block $C^8$. If desired, a pocket or channel $a^{25}$ may be formed in the guide-cylinder $A^9$, near the upper end thereof, for the reception of any oil running down from the telescopic plunger.

*Plunger-clamping mechanism.*—The mechanism for clamping the sections or members of the telescopic chair-body-supporting plunger together and for simultaneously clamping the plunger as a whole to the supporting-frame for the purpose of firmly supporting the chair-body against vibration or shaking movement is in some respects similar to the mechanism shown, described, and claimed in my Patent No. 581,670, granted April 27, 1897. I do not wish to be understood as claiming herein anything shown or described in said patent.

The plunger-clamping mechanism is best illustrated in Figs. 3, 5, 6, 7, 16, 17, 20 to 25, and 29 to 33, Sheet 5, and in the present instance is shown as consisting of a clamp-bar C, arranged parallel with the guide-cylinder $A^9$ of the telescopic plunger and loosely connected thereto near the top and bottom by screws $c\ c$ and a dowel-pin $c^{25}$. (See Figs. 5, 20, 22, and 25.) The inner surface of this bar is curved transversely to correspond with the outer surface of said guide-cylinder $A^9$ and is provided on said inner surface with a longitudinal projection or rib $c'$, which bears against said guide-cylinder in a longitudinal groove $a^{15}$ therein, the clamp-bar being adapted to have a slight horizontal rocking movement on said rib $c'$ as a fulcrum. A clamp block or shoe $C^8$ is fitted to slide horizontally in a bearing in the guide-cylinder $A^9$, the inner end of this block projecting into a longitudinal groove $a^{33}$ in the solid piston member $A^{11}$ of the telescopic plunger and is borne upon by the clamp-bar C. The front rounded edge of one member $C'$ of a toggle-lever bears in a longitudinal groove $c^2$ on the outer surface of the clamp-bar C and the outer member $C^2$ of the toggle-lever has bearing in an adjustable fulcrum-piece $C^3$. (See Figs. 3 and 5.) The adjustable fulcrum-piece $C^3$ is provided with a round shank $C^4$, which passes through a long tubular nut $C^5$, screwing into an extension $A^{12}$ of the supporting-frame section $A'$, this extension also serving to accommodate the clamp-bar C and its operating toggle-lever. That part of the long nut $C^5$ which projects outside of the supporting-frame extension $A^{12}$ is provided with wrench-engaging surfaces $C^6$, and a jam-nut $C^7$ is employed for locking the long nut in any position to which it may be adjusted. The inner member $C'$ of the toggle-lever is formed with two lugs $c^3\ c^3$ and a space $c^4$ between the lugs, and the outer member $C^2$ of the toggle-lever is formed with a cut-away or beveled portion $c^5$, on which is a lug $c^6$, adapted to register with the space $c^4$ of the member $C'$. (See Figs. 3 and 29 to 33.) This formation provides a very strong toggle-lever without interfering with its free movement. The outer member $C^2$ is extended some distance below the inner member and on its lower end is formed with a lug $c^7$, which slides in a groove $c^8$ in the top of a lever $C^9$. Said lever is provided with a pintle $C^{10}$, having bearing in a socket on the supporting-frame, the lever turning on this pintle as a fulcrum. The socket or bearing for the pintle of the lever $C^9$ is shown as being formed in a block $A^{13}$, secured to the outside of the cylinder $A'$ of the supporting-frame by screws $c^{10}$. (See Figs. 3 and 14.) An adjustable bearing may be provided for the top of the outer member $C^2$ of the toggle-lever and is shown as consisting of a screw $C^{15}$.

To the short arm $C^{11}$ of the lever $C^9$ is connected one end of the coiled spring $A^5$, the opposite end of which is connected to the arm $A^4$ of the bell-crank lever of the mechanism for clamping the rotary supporting-frame to the non-rotating pedestal, as hereinbefore described. The said spring acts with a tendency to pull the member $C^2$ of the toggle-lever in a direction to straighten out the same and force the clamp-bar C inward against the block or shoe $C^8$ with sufficient force to clamp the piston member $A^{11}$ of the telescopic plunger in the guide-cylinder $A^9$ thereof and at the same time bind or clamp the said guide-cylinder $A^9$ in the inner cylindrical section $A'$ of the supporting-frame. The lever $C^9$ is also provided with a long arm $C^{12}$, by which the lever may be rocked against the stress of the spring $A^5$ to bend or flex the toggle-lever and unclamp the telescopic plunger. It will thus be seen that the plunger-clamping mechanism normally acts to clamp the sections or member of the telescopic plunger together and the plunger as a whole to the supporting-frame, whereby the chair-body is rigidly supported against lateral vibration, that when the lever $C^9$ is actuated to overcome the action of the spring $A^5$, as will be hereinafter described, the toggle-lever simultaneously unclamps the clamp-bar C and shoe $C^8$, whereby the guide-cylinder $A^9$, carrying with it the clamp-bar C, is free to be moved up and down in the supporting-frame, and the piston-section $A^{11}$ of the plunger is free to be moved up and down in the guide-cylinder, and that when the lever $C^9$ is actuated to come within the influence of the spring the toggle-lever automatically acts to simultaneously clamp the members of the plunger together and to the supporting-frame in whatever position of vertical adjustment the plunger members may occupy relatively to each other or to the supporting-frame.

The toggle-lever may be adjusted to exert more or less force against the clamp-bar C by means of the adjusting-nut $C^5$, the member $C^2$ of the toggle-lever freely sliding in or out in the groove $c^8$ of the lever $C^9$ without disturbing the pivotal connection between the toggle-lever and the supporting-frame, which connection is by way of the pintle $C^{10}$ of the lever $C^9$.

It should be understood that portions of my improved plunger-clamping mechanism—such, for instance, as the toggle-lever—are not confined to telescopic plungers, but are applicable to simple or non-telescopic plungers.

*Elevating and lowering mechanism.*—The previously-described telescopic chair-body-supporting plunger is adapted to be raised and lowered for the purpose of varying the vertical position or adjustment of the chair-body supported thereby by means, preferably, of hydraulic elevating and lowering mechanisms, as next to be described. (See Figs. 4, 9, 26, 27, and 28.)

The pump for imparting an upward movement to the telescopic plunger and the valves for controlling the flow of oil between the oil-reservoir formed by the pedestal B and the pump and between the pump and the fixed plunger-cylinder $A^6$ are preferably carried by a single casting D, having detachable connection with the supporting-frame A.

The vertical pump-cylinder $D'$ is shown as made in a separate piece having screw-threaded connection at its lower end at $d$ with a socket or opening $D^2$ in the casting D, or, if preferred, the pump cylinder may be cast integral with the said casting D. An oil-inlet valve $D^3$, seated in a screw-plug $D^4$, which closes the lower end of the socket or opening $D^2$ in the casting, serves to admit oil from the oil-reservoir to the pump-cylinder through an opening $d'$ in the screw-plug $D^4$ when the pump-piston $D^5$ is raised and to prevent the return of oil to the reservoir when said piston is depressed. A port or passage-way $d^2$ in a portion of the casting D communicates with a chamber $d^3$ in the casting and through which all oil from the pump-cylinder to the plunger-cylinder and from the plunger-cylinder to the oil-reservoir must pass. The upper end of this chamber $d^3$ is closed by a plug $D^6$, screwed into the casting and forming a seat for an outlet-valve $D^7$ and a bearing for the stem $d^4$ of said outlet-valve. (See Fig. 27.) The outlet-valve $D^7$ is formed with a downwardly-extending tubular projection $d^5$, which constitutes a bearing and guide for the stem $d^6$ of a check-valve $D^8$, adapted to close the port or passage-way $d^2$ between the chamber $d^3$ and the pump-cylinder for preventing the return of oil to said pump-cylinder from the plunger-cylinder. The stem of the check-valve $D^8$, it will be seen, slides in the tubular bearing $d^5$ of the outlet-valve and automatically closes the passage-way $d^2$ by virtue of a spring $d^7$, surrounding the stem of the valve $D^8$ and bearing at its opposite ends against the valve $D^8$ and the projection $d^5$ of the outlet-valve, this spring also serving to normally close the outlet-valve. The stem $d^4$ of the outlet-valve is longitudinally corrugated, grooved, or flattened at one or more places on its sides, as at $d^8$, to permit oil to pass from the chamber $d^3$ to the oil-reservoir when the outlet-valve is tripped to lower the chair-body. The upper end of the outlet-valve stem projects above the plug $D^6$, and has fitted upon it a cap $D^9$, having an outer annular flange $d^9$, which loosely surrounds the outside of the upper end of the plug $D^6$, with a space between said flange and said plug. The function of the flanged cap $D^9$ is to deflect downwardly the oil escaping from the plunger-cylinder by way of the outlet-valve when the same is tripped to lower the chair-body, and thus deaden the noise which would otherwise be made by the oil issuing under pressure from around the valve-stem.

The outlet-valve may be tripped or opened for lowering the chair-body by applying downward pressure to its stem through or by way of the cap $D^9$. The means employed in the present organization for imparting this downward pressure to the outlet-valve will be explained farther on.

Communication between the chamber $d^3$ and the plunger-cylinder is made by means of a passage-way $d^{10}$ in an offset portion $D^{10}$ of the casting D and a passage-way $a^{16}$ partly in an offset portion $A^{13}$ of the lower portion $A^{10}$ of the supporting-frame and partly in one of the webs $a^{20}$ of said lower portion $A^{10}$, the casting D and the lower portion $A^{10}$ of the supporting-frame and their passage-ways constituting a communicating tube between the pump and plunger cylinders.

The detachable supporting connection between the casting D and parts carried thereby and the supporting-frame A may be made as follows: The offset $D^{10}$ of the casting D is fitted upon the offset $A^{13}$ of the supporting-frame in such a way that the passage-ways $d^{10}$ and $a^{16}$ register and afford communicating connection between the pump and the plunger-cylinder $A^6$. A screw-bolt $D^{11}$ passes through the offset $D^{10}$ and screws into the offset $A^{13}$, thus firmly clamping the casting upon the supporting-frame and making a liquid-tight connection between the passage-ways $d^{10}$ and $a^{16}$ at the junction of the pump-casting and the supporting-frame. By means of this construction the entire pumping mechanism, including its various valves and passage-ways, may be readily removed as a whole from the base for the purpose of cleaning or making repairs without disturbing other parts of the mechanism contained in the pedestal. To do this, it is only necessary to remove one or both of the detachable sections of the dome or cap $B^2$ for exposing the interior of the base and unscrewing the screw-bolt $D^{11}$, which, it should be observed, is located in a readily-accessible position. By this construction also the outlet-valve and the check-valve for preventing the return of oil to the pump-cylinder from the plunger-cylinder may be readily removed without removing or disturbing other parts of the pump mechanism or the casting upon which it is mounted. This may be accomplished by simply lifting the flanged cap $D^9$ from off the outlet-valve stem and unscrewing the screw-plug $D^6$ by way of its top or wrench-engaging surface, which is located above the pump and also in a line substantially on the level with the top of the outer cylindrical section of the supporting-frame in a position where it can readily be reached when the cap $B^2$ is removed. In this way the entire pumping mechanism may be readily removed or placed in position or only the outlet-valve $D^7$ and valve $D^8$ be removed, if desired.

Lugs $d^{25}$ on the pump-casting D may rest upon lugs or projections $a^{35}$ on the supporting-frame for giving additional support to said casting and the parts carried thereby.

The pump above referred to and now to be described is of peculiar and novel construction. The passage-way $d^2$ opens into the side of the pump-cylinder $D'$ a short distance above the bottom thereof and is preferably V-shaped in cross-sectional area or gradually narrows downwardly to an acute-angle termination. As the pump-piston $D^5$ near the completion of its downstroke passes the passage-way $d^2$, the escape of the oil therethrough is gradually restricted, thus gradually retarding the descent of the piston, and when the piston finally closes the passage-way $d^2$ some oil is confined between the bottom of the pump-cylinder and the piston and acts as a cushion to prevent the sudden stoppage or arresting of the piston. In this way it is practically impossible to jar the main operating-lever or the chair-body when said lever is depressed to elevate the chair-body.

The pump-piston $D^5$ is solid, is slightly longer than the pump-cylinder, and is substantially the same size as the interior diameter thereof. A stiff coiled spring $D^{12}$, surrounding the pump-cylinder and piston and bearing at one end against the pump-casting D and at its other end against an annular shoulder $d^{11}$ on the top of the piston, serves to normally hold the piston in its upper position and to return it to such position after the main operating-lever has been relieved of pressure of the foot.

Suitable packing is provided for the piston, said packing being similar to the packing used on the piston member of the telescopic plunger and consisting in this instance of two cup-shaped leather disks $D^{13}$, held in place upon the piston by means of a metallic head $D^{14}$, fitted snugly in the pump-cylinder and connected to the piston by screws $d^{12}$, only one of which is shown in the drawings, Fig. 27. In order to secure a proper close contact between the piston-packing and the pump-cylinder, an annular groove $d^{13}$ is made in the metallic piston-head $D^{14}$ behind each cup or section of the packing adjacent to and opening into grooves in the piston-head in which the leather cups are fitted. The lower groove $d^{13}$ communicates with the pump-cylinder beneath the piston by way of a port $d^{14}$, and a similar port $d^{20}$ affords communication with the upper groove $d^{13}$. When the piston descends, oil under pressure beneath the piston is forced through the port $d^{14}$ into the groove $d^{13}$, with the effect of expanding or forcing the lower packing-cup outwardly against the wall of the cylinder, and in a similar way the upper packing-cup is expanded during the upstroke of the piston.

The pump-piston for a portion of its length above its packing is made of smaller diameter than the interior of the pump-cylinder for the purpose of providing an annular oil-space $d^{15}$ around the piston and between it and the cylinder, the top and bottom of this space being formed, respectively, by the lower end of the top or gland $D^{15}$ of the cylinder and an annular shoulder $d^{16}$ on the piston. In the top of the piston is a recess or cavity $d^{17}$, which communicates with the oil-space $d^{15}$ through a vertical passage $d^{18}$ and a horizontal passage $d^{19}$, both in the piston, the passage $d^{19}$ opening into the oil-space $d^{15}$ a short distance above the shoulder $d^{16}$. The cavity $d^{17}$ is intended to be filled or partly filled with oil which passes to and from the oil-space around the piston by way of the passages $d^{18}$ and $d^{19}$ for the purpose of keeping this space always filled with oil.

When the piston is in its lowest position, the oil-space is lengthened out and is filled with oil. As the piston rises and the oil-space decreases by reason of the shoulder $d^{16}$ on the piston approaching the top of the cylinder the oil displaced from the oil-space is forced up into the cavity $d^{17}$ through the communicating passages, this movement continuing until the passage $d^{19}$ has passed the bottom of the cylinder-top $D^{15}$, thus shutting off the escape of the oil from the oil-space. The oil thus confined in the oil-space serves to cushion the upstroke of the piston and prevent all jar or the sudden stoppage or arresting of the piston. As the piston descends the oil flows back into the oil-space from the recess in the top of the piston.

In a pump constructed as I have just described the operation is exceedingly smooth and soft, the pump-piston, and consequently its operating-lever, being cushioned at the ends of both its upward and downward strokes, and the packing between the piston and cylinder is always expanded or tightened during the upward or passive stroke of the piston as well as during the downward or effective stroke of the piston, it being understood that the port $d^{20}$ opens into the oil-space $d^{15}$.

*Operating-lever.*—As before stated, a single foot-actuated operating-lever F is employed for actuating the pump for elevating the chair-body, for tripping the outlet-valve, for lowering the chair-body, for controlling the plunger-clamping mechanism, and for controlling the locking mechanism between the rotatable supporting-frame and the non-rotating pedestal. The instrumentalities herein shown for actuating and controlling these several mechanisms by a single lever—these several mechanisms having already been described—are now to be explained. (See Figs. 3, 4, 5, 6, 7, 8, 30, 32, 34, 35, 36, and 37.)

The main operating-lever F is pivoted to rock vertically about a horizontal pivot $f$, which connects its inner end to an upright post F', which is swiveled in a bearing $F^2$ of the supporting-frame A, the operating-lever being movable horizontally with said upright post. (See particularly Figs. 34, 35, and 36.) The operating-lever, therefore, is capable of being rocked vertically for the purpose of actuating the pump mechanism and moved horizontally into various positions for the purpose of controlling the several other mechanisms above referred to.

The operating-lever is suitably curved to best adapt it for the purpose intended, and at its inner end is provided with a short arm or lever $F^3$, extending substantially in the same direction as the operating-lever. On the under side of the outer end of the short arm $F^3$ of the operating-lever is a socket $f'$, (see particularly Fig. 4,) and a piston-rod $F^4$, having balls $f^2$ on its opposite ends, bears loosely in the socket $f'$ of the short arm of the operating-lever and in a socket in the upper end of the pump-piston $D^5$. When the operating-lever is depressed, as by the foot, the pump-piston $D^5$ is also depressed through the medium of the piston-rod $F^4$. As before explained, the coiled spring $D^{12}$, surrounding the pump-cylinder and piston, serves to normally hold the piston in its upper position and return it to such position after the main operating-lever has been relieved of pressure of the foot. The same spring of course serves to normally elevate the main operating-lever. By this construction the pumping mechanism may be actuated by vertically rocking the operating-lever to elevate the chair-body to any desired position.

The mechanism for tripping the outlet-valve for lowering the chair-body, the mechanism for controlling the telescopic-plunger-clamping mechanism, and the mechanism for controlling the locking mechanism between the rotatable supporting-frame and the non-rotating pedestal may be actuated or brought into play by the horizontal turning movement of the operating-lever. These several controlling mechanisms will now be described in the order just above named, it being understood that owing to the loose ball-and-socket connection of the pump-piston rod $F^4$ the operating-lever and its short arm $F^3$ may be freely moved horizontally for the purpose of controlling the mechanisms about to be described without disturbing or operating the pump mechanism.

The controlling mechanism for tripping the outlet-valve $D^7$ for lowering the chair-body is as follows: Rigidly projecting from the horizontally-swiveling post F' is a controlling-arm $F^5$, which moves horizontally with the main operating-lever, but is not moved when said lever is rocked vertically, the operating-lever rocking vertically about the pivot $f$ without moving the post F' or the controlling-arm $F^5$ rigidly connected thereto. This controlling-arm about midway its length is provided with an adjustable lug or projection shown as consisting of a screw $F^6$, which may be locked in its adjusted position by means of a set-screw $f^2$. (See Figs. 34, 35, 36, and 37.) This lug or projection is adapted to impinge, when the operating-lever is moved the proper distance to the right, upon a roller-bearing $f^3$ on the outer end of a vertically-rocking arm or lever $F^7$, pivoted to a lug $f^4$ on the supporting-frame and bearing near its outer end upon the cap $D^9$ of the outlet-valve. The downward movement which may thus be imparted by the horizontal movement of the operating-lever to the lever $F^7$ through the controlling-arm $F^5$ serves to depress the cap $D^9$ and trip the lowering-valve $D^7$, as before described. The extent to which the outlet-valve may be opened by the operating-lever may be regulated by adjusting the screw $F^6$ of the controlling-arm, and the rate of descent of the chair-body may thus be nicely regulated, as desired. The vertically-rocking arm or lever $F^7$ may be slipped in place upon the lug $f^4$ when one section of the dome or cap $B^2$ is removed, a long lug $f^5$ on this cap-section serving to hold the arm or lever in position when the cap-section is in place. (See Figs. 6 and 7.)

The telescopic-plunger-clamping mechanism is controlled by the horizontal movement of the operating-lever through the medium of the same controlling-arm $F^5$ through which the movement of the operating-lever is imparted for tripping the outlet-valve for lowering the chair-body. For this purpose the controlling-arm $F^5$ is provided at or near its outer end with a roller-bearing $f^6$, which is adapted to bear against the side of the long arm $C^{12}$ of the lever $C^9$ of the toggle-lever plunger-clamping mechanism. The outer surface of the arm $C^{12}$ against which the roller $f^6$ of the controlling-arm bears is of cam form for the purpose of imparting the movement of the controlling-arm to the arm $C^{12}$ and also for imparting certain movements of said arm $C^{12}$ to said controlling-arm under certain conditions, as will soon be made plain. In Fig. 6 the parts are shown in their normal or inoperative position, with the roller-bearing $f^6$ of the controlling-arm resting near a cam or shoulder $f^7$ on the long arm $C^{12}$ of the lever $C^9$ and the operating-lever and the controlling arm $F^5$ occupying a position to the left of the position which they must assume when the chair-body is being elevated. When in this position, the controlling-arm has no effect upon the lever $C^9$, and the spring $A^5$ is free to act upon said lever to straighten out the toggle-lever, and thus bring the plunger-clamping mechanism into action. By moving the operating-lever to the right of its normal position the roller-bearing $f^6$ of the controlling-arm is caused to ride upon the arm $C^{12}$ of the lever $C^9$ until it rests against a cam or shoulder $f^8$ at one end of a depression $f^9$ near the outer end of said arm $C^{12}$, the parts then being in position for elevating the chair, this position being illustrated in Fig. 7. This movement of the operating-lever forces the arm $C^{12}$ inward and rocks the toggle-lever member $C^2$ against the pulling action of the spring $A^5$ and relieves the clamp-bar C from the action of said spring, whereby the telescopic plunger members are left free to be moved up or down. The cam-surface of the lever-arm $C^{12}$ is so proportioned as to yieldingly hold the operating-lever in either its normal or its elevating positions, and it will be obvious that movement of the operating-lever to the right of its elevating position operates the outlet-valve to lower the chair-body, as previously explained, and at the same time the roller-bearing $f^6$ acts upon the lever-arm $C^{12}$ in such a way as to hold said arm in the position in which the plunger-clamping mechanism is maintained in its inoperative position while the chair-body is being lowered. A stop or shoulder $f^{10}$ at the outer end of the depressed portion $f^9$ of the lever-arm $C^{12}$ serves to limit the movement of the lever $F^5$ and the operating-lever to the right. The instant the operating-lever is relieved from pressure the spring $A^5$, acting through the lever $C^9$ and controlling-arm $F^5$, pulls it into its normal position and throws the plunger-clamping mechanism into locking position.

When in its normal position, the operating-lever should be locked against downward movement, so that it may be used as a foot-rest for the operator. This may be accomplished by the short arm $F^3$ of the operating-lever resting upon a fixed portion of the supporting-frame, as a lug $f^{11}$ on the section $A'$ of the supporting-frame, when said operating-lever is in its normal position. (See Fig. 8.) Upon moving the operating-lever into its position for elevating the chair-body its short arm $F^3$ clears the lug $f^{11}$ and leaves the lever free to be rocked vertically.

The locking mechanism between the rotatable supporting-frame A and the non-rotating pedestal B is also controlled by the horizontal movement of the operating-lever through the medium of the controlling-arm $F^5$. (See particularly Figs. 6, 7, 10, 34, 35, and 36.) This arm, near its inner or fulcrum end, is provided with an adjustable stud $f^{12}$, which screws into it and is locked in its adjusted position by a set-screw $f^{13}$. The stud $f^{12}$, when the operating-lever is moved horizontally to the left of its normal position, is adapted to strike against one end of a push-rod $F^8$, mounted to reciprocate in a bearing-lug $F^9$ on the section $A'$ of the supporting-frame. The opposite end of this push-rod bears against the short arm $F^{15}$ of the bell-crank lever $A^4$ of the clamp-rod $A^2$ of the mechanism for clamping the supporting-frame to the pedestal. Slight pressure on the push-rod $F^8$, caused by sidewise movement of the operating-lever to the left of its normal position, serves to rotate the clamp-rod $A^2$ in opposition to the pull of the spring $A^5$ to release the clamp-block $A^3$ and permit the supporting-frame and chair-body to be freely rotated. When the operating-lever is relieved of pressure, the spring $A^5$ acts through the medium of the lever $C^9$ and controlling-lever $F^5$ to automatically turn the clamp-rod to lock the chair-body in its position of horizontal adjustment and to restore the operating-lever to its normal position.

The horizontal movement of the operating-lever to the left, necessary for unclamping the clamping mechanism between the supporting-frame and pedestal for permitting the chair-body to be rotated horizontally, may be performed without disturbing or interfering with the adjustment of any of the other mechanisms of the chair under the control of said operating-lever.

The operation of the operating-lever in performing its various functions may be described as follows: In Figs. 2 and 6 the operating-lever is shown in full lines and in Fig. 8 in dotted lines, marked "Normal," as occupying its normal position, in which the chair-body is locked against rotation and the telescopic plunger firmly clamped, and the operating-lever is held against downward movement. By moving the operating-lever to the right of its normal position into the position shown in Figs. 7 and 8 the plunger-clamping mechanism is automatically released and the operating-lever is free to be rocked downwardly, but the lowering-valve and the supporting frame-clamping mechanism are not disturbed. After the chair-body has been elevated to the desired extent by vertical rocking movement of the operating-lever this lever should be moved to its normal position to permit the plunger-clamping mechanism to act and also to transform the operating-lever into an operator's foot-rest. To lower the chair-body, the operating-lever is moved to the right as far as it will go, into the position shown in full lines, Fig. 5, and dotted lines marked "Lowering," Fig. 8. This movement simultaneously trips the lowering-valve and releases the plunger-clamping mechanism without disturbing the clamping mechanism between the supporting-frame and the pedestal. Immediately upon releasing the operating-lever from pressure of the foot it automatically moves back to its normal position and the lowering-valve is closed and the telescopic plunger clamped. By moving the operating-lever to a position to the left of its normal position into the position indicated by dotted lines marked "Turning," Figs. 8 and 9, the clamping mechanism between the supporting-frame and the pedestal is released, and the chair-body may be freely rotated horizontally, and immediately upon relieving the operating-lever of pressure it automatically resumes its normal position and the chair-body becomes locked in any horizontal position to which it may have been adjusted.

I have shown and explained the operating-lever as automatically resuming its normal position immediately after it has been relieved from pressure required to move it to its position for tripping the outlet-valve; but obviously the cam-surface of the arm $C^{12}$ of the toggle-lever may be so formed as to cause the operating-lever to automatically move to its position for elevating the chair-body after the outlet-valve has been tripped. In fact this mechanism can readily be constructed to cause the operating-lever to act in any desired manner. For example, it can be constructed so that after the operating-lever has been moved to trip the outlet-valve and it is suddenly released it will fly back to its normal position, but if gradually released it will simply move to its position for elevating the chair-body.

It should be understood that the roller-bearing $f^6$ of the controlling-arm $F^5$, striking against the shoulder $f^7$ of the lever-arm $C^{12}$, arrests the movement of said controlling-arm, as well as the operating-lever when the latter has been released after tripping the outlet-valve, and also when said lever is moved from its elevating to its normal position, and that the spring $A^5$ serves to cushion the parts when the said roller-bearing $f^6$ strikes the shoulder $f^7$.

A plate-spring $F^8$ may be interposed between the vertically-movable short arm $F^3$ of the operating-lever and the controlling-lever $F^5$ for the purpose of cushioning the said short arm $F^3$ when the same at the end of its upward movement strikes the controlling-arm. Said spring may be secured to the top of the short arm $F^3$, as plainly shown in Fig. 8.

The operating-lever F projects outside of the base through an aperture $b$ in the detachable cap or dome $B^2$, (see Figs. 1, 6, 7, and 8,) which aperture is partly in one section of the cap and partly in the other section thereof. This construction permits of the ready removal of the cap, either section of which may be detached by moving it laterally from the supporting-frame. As the operating-lever has no connection whatever with the cap $B^2$, it will be seen that when either or both sections of said cap are removed the entire elevating mechanism is exposed to view, and while thus exposed may be actuated by the operating-lever and its action plainly seen.

The operating-lever is suitably curved both horizontally and vertically and is provided on its outer extremity with a foot-rest $F^9$. It is best operated by the foot for elevating the chair-body by placing the foot upon the rest $F^9$ and applying downward pressure thereto with a step-by-step or pumping motion, and for performing its other functions pressure should be applied to the side of the rest to move the lever horizontally in one direction or the other. This latter movement may be more conveniently accomplished by the operator placing one foot on the floor, with the side of his leg touching one side of the foot-rest, and pressing the rest to one side by inclining his leg in the proper direction without lifting his foot. In order that the sides of the rest may not hurt the leg of the operator when the same is pressed against the rest, I have shown the rest as being provided with stuffed or upholstered pads $F^{10}$, secured to the sides thereof in any suitable manner. The top of the rest may, if desired, be covered by a rubber pad $F^{11}$, which will prevent the foot from slipping.

Upon the operating-lever, inside the base, or, to speak more definitely, just inside the cap or dome $B^2$, is a sharp-edged disk or flange $F^{12}$ for the purpose of arresting any oil that might get upon the inner portion of the lever, and thus prevent its escape to the outside of the base. Should any oil get upon the inner portion of the lever, it will be met by the flange and drip off its edge into the interior of the pedestal.

A chair-body H is, as usual, mounted upon the telescopic plunger by way of a yoke or cross-head G, connected to the upper end of the piston member $A^{11}$ of the plunger.

While I have described and illustrated but a single embodiment of my present improvements, it will be quite obvious to those familiar with the art to which my invention appertains that this embodiment is susceptible of many variations and modifications without departing from the spirit or scope of my invention. Not only can the details of construction be modified more or less, but some of the mechanisms may be used without the others or in different relations and combinations. I therefore wish it to be understood that my invention is not restricted to the particular details of construction or the precise groupings or combinations of mechanisms herein shown and described.

I claim as my invention—

1. The combination, in a dental-chair base, of the cylindrical pedestal having a closed bottom and forming an oil-reservoir, a supporting-frame consisting of an outer cylindrical section and an inner cylindrical section, the said outer section having supporting and rotating connection with said pedestal, and the inner section extending above the top of the outer section and connected thereto by a horizontal web located below the top of the pedestal and above the oil in the reservoir, and a detachable cap closing the space between the inner and outer sections of the supporting-frame above said horizontal web, substantially as and for the purpose described.

2. The combination, in a dental-chair base, of the supporting-frame consisting of connected inner and outer cylindrical sections, the inner section extending above the outer section, a chair-body-supporting plunger mounted to move up and down in the said inner section of the supporting-frame, plunger-elevating mechanism mounted in the supporting-frame and an operating-lever for said mechanism pivotally connected to said supporting-frame, and a cap detachably connected with said supporting-frame, and closing the space between the inner and outer sections thereof, said cap being independent of said elevating mechanism and its operating-lever, whereby when said cap is detached, the said elevating mechanism is exposed to view and the operation of the same is not interfered with, substantially as described.

3. The combination, in a dental-chair base, of the non-rotatable pedestal, a supporting-frame having bearing therein and adapted to be horizontally rotated relatively thereto, a clamp located between said supporting-frame and said pedestal, a spring acting upon said clamp to cause it to normally lock the supporting-frame against rotation, a lever, and connections between said lever and said clamp by which said clamp may be actuated against the stress of its spring to release the supporting-frame and leave it free to be rotated, substantially as and for the purpose described.

4. The combination, in a dental-chair base, of the non-rotatable pedestal, a supporting-frame having bearing in said pedestal and adapted to be rotated therein, a vertical clamp-rod mounted in said supporting-frame and capable of being horizontally turned but having no endwise movement, a horizontally-movable clamp for locking said supporting-frame to the pedestal, said clamp being actuated by the turning of said clamp-rod, and means also carried by said supporting-frame for operating said clamp-rod, substantially as and for the purpose described.

5. The combination, in a dental-chair base, of the non-rotatable pedestal, a supporting-frame having bearing in said pedestal and adapted to be horizontally rotated therein, a clamp-rod mounted to turn in bearings in said supporting-frame, a clamp actuated by said clamp-rod, a spring acting upon said clamp-rod for normally causing said clamp to clamp said supporting-frame to the pedestal against rotation therein, and means for turning said clamp-rod against the stress of said spring for unclamping said supporting-frame and permitting the same to be rotated, substantially as described.

6. The combination, in a dental-chair base, of the non-rotatable pedestal, a supporting-frame having bearing in said pedestal and adapted to be horizontally rotated therein, a clamp-rod mounted to turn in bearings in said supporting-frame, a clamp actuated by said rod, a bell-crank lever connected to said clamp-rod, a spring connected to one arm of said bell-crank lever for causing said clamp to normally clamp said supporting-frame to the pedestal against rotation, and a controlling-lever for acting upon the other arm of said bell-crank lever for unclamping said supporting-frame and permitting the same to be rotated, substantially as described.

7. The combination, in a dental-chair base, of the non-rotatable pedestal, a supporting-frame having bearing in said pedestal and adapted to be horizontally rotated therein, a vertical clamp-rod mounted to turn in bearings in said supporting-frame and having a cam-surface, a clamp-block mounted to slide horizontally in a bearing in said supporting-frame and adapted to bear against said pedestal, said clamp-block being borne upon by the cam-surface of said clamp-rod, and means for actuating said clamp-rod for causing the clamp-block to clamp and unclamp the supporting-frame to and from the pedestal, substantially as described.

8. In a dental-chair-body support, the combination of the plunger, the cylinder in which said plunger is movable up and down, a buffer-rod fitted in the lower end of said plunger, and means for normally projecting said buffer-rod from said plunger, substantially as and for the purpose described.

9. In a dental-chair-body support, the combination of the plunger formed with an oil-chamber in its lower end, the cylinder in which said plunger moves up and down, a buffer-rod having a head movable up and down in said oil-chamber, the oil being adapted to pass said head to and from said oil-chamber, whereby when the buffer-rod strikes the bottom of said plunger-cylinder, the oil confined in the oil-chamber gradually escapes and cushions the final downward movement of the plunger, substantially as described.

10. In a dental-chair-body telescopic supporting-plunger, the combination of the fixed plunger-cylinder, the cylindrical plunger member movable up and down therein, the guide-cylinder connected to said cylindrical plunger member and movable up and down therewith and surrounding said fixed plunger-cylinder, a buffing device on the lower end of said guide-cylinder, the piston member of the plunger movable up and down in said cylindrical member and said guide-cylinder, and a buffing device located between the top of said guide-cylinder and the bottom of said piston member, substantially as and for the purpose described.

11. The combination, in a dental-chair base, of a vertically-movable chair-body-supporting plunger, clamping mechanism therefor comprising a horizontally-movable toggle-lever, a spring acting upon said toggle-lever for causing the same to normally clamp said plunger and means for unclamping said toggle-lever, the said clamping mechanism acting to clamp the plunger against upward and downward and lateral movement at all times except when acted upon by the means for unclamping it, substantially as described.

12. The combination, in a dental-chair base, of a telescopic supporting-plunger, separate locking devices for each member of said telescopic plunger, a horizontally-movable toggle-lever for simultaneously operating said locking devices, and means for actuating said toggle-lever, substantially as and for the purpose set forth.

13. The combination, in a dental-chair base, of a telescopic supporting-plunger, separate clamping devices for each member thereof, a toggle-lever, a spring acting upon said toggle-lever for causing the clamping devices to normally clamp the telescopic supporting-plunger, and means for simultaneously unclamping said clamping devices, substantially as and for the purpose described.

14. The combination, with a chair-body-supporting plunger, of clamping mechanism therefor comprising a toggle-lever, the outer member of which is composed of two parts having sliding connection with each other, and an adjustable fulcrum-piece against which one part of said outer member of the toggle-lever has bearing, substantially as and for the purpose described.

15. The combination, in a dental-chair base, of a telescopic supporting-plunger, separate locking devices for each member thereof, a toggle-lever, one member of which is provided with two arms, a spring acting upon the toggle-lever through one of its arms for causing the separate locking mechanisms to simultaneously grip the respective members of the telescopic plunger, and means for acting upon the toggle-lever through its other arm for causing said locking mechanisms to release the said plunger members, substantially as and for the purpose set forth.

16. The combination, in a dental-chair base, of the supporting-frame, the telescopic plunger movable up and down therein, the clamp-bar arranged parallel with the outer member of the telescopic plunger, the clamp-block fitted to move in an opening in the outer member of the telescopic plunger to bear upon the inner member thereof and be acted upon by the clamp-bar, and a toggle-lever for simultaneously causing the clamp-bar and clamp-block to clamp the members of the plungers together and to the supporting-frame, substantially as and for the purposes described.

17. The combination, in a dental-chair base, of the supporting-frame, a telescopic plunger movable up and down in a cylinder of said supporting-frame, a clamp-bar arranged parallel with the outer member of said telescopic plunger to which said clamp-bar is connected in such a way as to be capable of being rocked horizontally, means for horizontally rocking said clamp-bar to force it to clamp the outer member of the telescopic plunger to the said supporting-frame, and means for transmitting the movement of said clamp-bar to the inner member of said telescopic plunger, whereby when the clamp-bar is actuated the members of the telescopic plunger are simultaneously clamped in the supporting-frame in any position of vertical adjustment they may occupy, substantially as described.

18. In elevating mechanism for dental chairs, the combination of the pump-cylinder and its top or gland, the piston movable up and down therein and formed with an inclosed oil-space and an exposed oil-recess, and also having a passage-way between said oil-space and said oil-recess, the said passage-way opening into the oil-space a short distance above its lower end, whereby just before the piston reaches the end of its upstroke the said passage-way is closed and the oil confined in the oil-space serves to cushion the piston at the end of its upstroke, substantially as described.

19. The combination, in a dental-chair base, of the supporting-frame having an outer cylindrical section the upper end of which is open, a cap detachably connected with said supporting-frame for closing its upper open end, an upright plunger-cylinder and a pump-cylinder mounted in said supporting-frame, a communicating tube between said cylinders, and an outlet-valve-containing plug detachably connected to the top of said communicating tube, the top of said plug being located in a line substantially on a level with the top of the outer cylindrical section of the supporting-frame, whereby when said cap is removed the said outlet-valve-containing plug is exposed and may be readily detached from said communicating tube, substantially as and for the purpose described.

20. The combination, in a dental-chair base, of the pedestal, a supporting-frame mounted therein, a plunger-cylinder fixed to said supporting-frame, a casting having detachable connection with said supporting-frame, pump and its valves carried by said casting, a passage-way in said supporting-frame communicating with the plunger-cylinder, a passage-way in said casting communicating with the pump, said passage-ways being adapted to register with each other when the casting is in place, and a bolt passing through said casting into said supporting-frame for detachably connecting said casting to said supporting-frame, the head of said bolt extending above the top of the pump in a readily-accessible position, whereby the casting, the pump and its valves may be removed as a whole from the base without disturbing other mechanisms contained within said base, substantially as described.

21. In elevating and lowering mechanism for dental chairs, the combination of the outlet or lowering valve the stem of which projects above the top of the plug in which the valve is mounted, and a flanged cap secured to said valve-stem above said valve-plug, substantially as and for the purpose described.

22. In elevating and lowering mechanism for dental chairs, the combination of the outlet or lowering valve the stem of which projects above the top of the plug in which the valve is mounted, and a flanged cap secured to said valve-stem above said valve-plug, the flange of said cap loosely surrounding the top of said valve-plug, whereby the oil escaping from around the valve-stem when the valve is opened, strikes against the flanged cap and is thereby deflected downwardly, substantially as described.

23. In a dental-chair base, the combination of the pedestal, a supporting-frame mounted to rotate horizontally therein, mechanism for locking said supporting-frame to said pedestal, a vertically-adjustable supporting-plunger, clamping mechanism for the same, plunger elevating and lowering mechanism, and a single operating-lever for controlling all of said mechanisms, substantially as and for the purposes described.

24. In a dental-chair base, the combination of the pedestal, a supporting-frame mounted to rotate horizontally therein, mechanism for locking said supporting-frame to said pedestal, a vertically-adjustable supporting-plunger, clamping mechanism for the same, plunger-elevating mechanism, and a single operating-lever for controlling all of said mechanisms, substantially as and for the purposes described.

25. In a dental-chair base, the combination of the pedestal, a supporting-frame mounted to rotate horizontally therein, mechanism for locking said supporting-frame to said pedestal, a vertically-adjustable supporting-plunger, clamping mechanism for the same, plunger-lowering mechanism, and a single operating-lever for controlling all of said mechanisms, substantially as and for the purposes described.

26. In a dental-chair base, the combination of the pedestal, a supporting-frame mounted to rotate horizontally therein, mechanism for locking said supporting-frame to said pedestal, a vertically-adjustable supporting-plunger, elevating and lowering mechanism therefor, and a single operating-lever for controlling all of said mechanisms, substantially as and for the purposes described.

27. In a dental-chair base, the combination of the pedestal, a supporting-frame mounted to rotate horizontally therein, mechanism for locking said supporting-frame to said pedestal, a vertically-adjustable supporting-plunger, mechanism for locking said plunger, and a single operating-lever for controlling said mechanisms, substantially as and for the purpose described.

28. The combination, in a dental-chair base, of the pedestal, the supporting-frame supported by and adapted to rotate horizontally therein, mechanism for clamping the supporting-frame to said pedestal, the chair-body-supporting plunger vertically adjustable in the supporting-frame, mechanism for elevating the supporting-plunger, and a single lever for both operating the plunger-elevating mechanism and for controlling the mechanism for clamping the supporting-frame to the pedestal, substantially as set forth.

29. The combination, in a dental-chair base, of the pedestal, a supporting-frame mounted to rotate horizontally therein, a vertically-adjustable supporting-plunger, elevating mechanism for the same, automatic clamp mechanism for normally locking said supporting-frame to said pedestal, and means for releasing said automatic clamp mechanism for permitting said supporting-frame to be rotated, said means being under the control of the operating-lever of the plunger-elevating mechanism, substantially as and for the purpose described.

30. In a dental-chair base, the combination of the supporting-frame, the plunger, plunger-elevating mechanism, a post mounted upon said supporting-frame and having horizontal turning connection therewith, and an operating-lever for said plunger-elevating mechanism connected at its inner end to said post by a horizontal pivot, whereby said operating-lever may be rocked vertically independently of said post and be moved horizontally therewith, substantially as and for the purposes described.

31. The combination, in a dental-chair base, of the vertically-adjustable supporting-plunger, the fixed plunger-cylinder, the pump, an operating-lever for actuating said pump by vertical movement, a communicating passage-way between said pump and said fixed plunger-cylinder, an outlet-valve in said passage-way, a pivoted arm bearing upon the stem of said outlet-valve and adapted to be rocked downwardly for tripping said outlet-valve by horizontal movement of said operating-lever, substantially as described.

32. The combination, in a dental-chair base, of a vertically-adjustable supporting-plunger, plunger-clamping mechanism, a horizontally-rocking lever connected to said plunger-clamping mechanism and provided with two arms, a spring connected to one arm of said lever for causing the plunger-clamping mechanism to normally clamp the plunger, plunger-elevating mechanism, an operating-lever therefor, and a controlling-arm actuated by said operating-lever and adapted to bear upon the free arm of said plunger-clamping-mechanism lever, whereby when the operating-lever is moved into a position for operating the plunger-elevating mechanism, the plunger-clamping mechanism is automatically unclamped, substantially as described.

33. The combination, in a dental-chair base, of a vertically-adjustable supporting-plunger, plunger-clamping mechanism, plunger-elevating mechanism and plunger-lowering mechanism, a lever connected to said plunger-clamping mechanism, a spring connected to said lever for causing the plunger-clamping mechanism to normally clamp the plunger, a single operating-lever for the plunger elevating and lowering mechanisms, and connections between said operating-lever and said lever of the plunger-clamping mechanism, whereby when the operating-lever is moved to operate either the plunger-elevating mechanism or the plunger-lowering mechanism, the plunger-clamping mechanism is automatically unclamped, substantially as described.

34. The combination, in a dental-chair base, of the pedestal, the supporting-frame rotatably mounted therein, mechanism for clamping said supporting-frame to said pedestal, a vertically-adjustable supporting-plunger, clamping mechanism for the same, plunger-elevating mechanism, plunger-lowering mechanism, a lever, a spring connected to said lever for causing the supporting-frame-clamping mechanism and the plunger-clamping mechanism to normally act, a single operating-lever and connections, whereby when said operating-lever is moved in one direction to operate either the plunger-elevating mechanism or the plunger-lowering mechanism the plunger-clamping mechanism is automatically unclamped and the clamping mechanism for the supporting-frame is undisturbed, and when said operating-lever is moved in the opposite direction, said clamping mechanism for the supporting-frame is unclamped, substantially as described.

35. In a dental-chair base, the combination of the pedestal, the supporting-frame mounted to rotate horizontally therein, mechanism for clamping the supporting-frame to said pedestal, a vertically-adjustable supporting-plunger, mechanism for elevating said supporting-plunger, and a single lever which operates said plunger-elevating mechanism when moved vertically and unclamps the supporting-frame-clamping mechanism when moved horizontally in one direction, substantially as and for the purpose described.

36. The combination, in a dental-chair base, of the pedestal, the supporting-frame rotatably connected with said pedestal, the vertically-adjustable chair-body-supporting plunger, locking mechanism between the pedestal and the supporting-frame, plunger elevating, lowering and clamping mechanism, and a single operating-lever for controlling all of these mechanisms, said operating-lever having its pivotal and operative connections inside said base, substantially as and for the purpose described.

37. The combination, in a dental-chair base, of the pedestal, the supporting-frame rotatably connected therewith, the vertically-adjustable chair-body-supporting plunger, locking mechanism between said pedestal and said supporting-frame, plunger elevating and lowering mechanism, a single operating-lever for controlling all of these mechanisms pivoted to said supporting-frame, and a cap connected with said supporting-frame and inclosing the pivotal and operative connections of said operating-lever, said cap being provided with an aperture through which said operating-lever projects, substantially as and for the purpose described.

38. An operating-lever for dental chairs pivoted to rock vertically and turn horizontally and provided with an arm which moves vertically with said lever, and with a controlling-arm which moves horizontally with said lever but is not affected by vertical movement of the same, substantially as and for the purpose described.

39. The combination, in a dental-chair base, of a vertically-movable chair-body-supporting plunger, clamping mechanism therefor comprising a horizontally-movable toggle-lever, a spring acting upon said toggle-lever for causing the same to normally clamp said plunger, and means under the control of the operating or elevating lever of the chair for unclamping said toggle-lever, substantially as described.

40. An operating-lever for dental chairs having a flange thereon inside the chair base or pedestal for the purpose of deflecting all oil on the inner portion of the lever into the oil-reservoir and preventing the same from reaching that portion of the lever which projects outside of said base or pedestal, substantially as described.

41. The combination, in a dental-chair base, of the vertically-adjustable supporting-plunger, the pump for elevating said plunger, an operating-lever for said pump, and a piston-rod having ball-and-socket connection with said operating-lever and also with the piston of said pump, whereby said operating-lever may be moved horizontally as well as rocked vertically, substantially as described.

42. In an elevating-machine having a base and rotating pedestal, a seat-elevating pump, plunger-tubes, a valve independent of the pump normally closing the outlet from the tubes, a lever, and mechanism intermediate the lever and valve movable directly by the lever against the valve to open the same, said mechanism comprising an adjustable piece, and pedestal-locking mechanism, the lever being operative to control both the outlet-valve and the pedestal-locking mechanism and also to open the valve without affecting the said locking mechanism.

43. In a dental-chair base, the combination of the non-rotatable pedestal, a supporting-frame mounted to rotate horizontally in respect thereto, mechanism for locking said supporting-frame to said pedestal, a vertically-adjustable supporting-plunger, lowering mechanism therefor, and a single lever for operating or controlling both of said mechanisms, substantially as and for the purpose described.

44. In a dental-chair base, the combination of the non-rotatable pedestal, a supporting-frame mounted to rotate horizontally in respect thereto, mechanism for locking said supporting-frame to said pedestal, a vertically-adjustable supporting-plunger, lowering mechanism therefor, and a single lever for operating or controlling both of said mechanisms, and which when actuated to operate the supporting-frame-locking mechanism does not affect the plunger-lowering mechanism, substantially as and for the purpose described.

In testimony whereof I affix my signature in presence of two witnesses.

BASIL M. WILKERSON.

Witnesses:
JAS. H. HARRIS,
JOHN C. UHLER.